(12) United States Patent
Lee et al.

(10) Patent No.: US 6,913,228 B2
(45) Date of Patent: Jul. 5, 2005

(54) AIRCRAFT WITH ACTIVE CENTER OF GRAVITY CONTROL

(75) Inventors: Howard Lee, Monterey Park, CA (US); John M. Morgenstern, Lancaster, CA (US); Hossein Aminpour, Dana Point, CA (US)

(73) Assignee: Supersonic Aerospace International, LLC, Las Vegas, NV (US)

( * ) Notice: Subject to any disclaimer, the term of this patent is extended or adjusted under 35 U.S.C. 154(b) by 0 days.

(21) Appl. No.: 10/656,501

(22) Filed: Sep. 4, 2003

(65) Prior Publication Data

US 2005/0051666 A1 Mar. 10, 2005

(51) Int. Cl.$^7$ ................................. B64D 37/00
(52) U.S. Cl. ................... 244/135 C; 244/93; 701/1; 701/3; 73/65.05
(58) Field of Search ......................... 244/135 C, 93, 244/75 R, 177; 701/1, 3; 73/65.05, 65.06

(56) References Cited

U.S. PATENT DOCUMENTS

| | | | |
|---|---|---|---|
| 2,755,046 A | * | 7/1956 | Underwood, Jr. ....... 244/135 C |
| 2,823,880 A | * | 2/1958 | Bergeson ................. 244/135 C |
| 4,545,019 A | | 10/1985 | Glover |
| 4,622,639 A | * | 11/1986 | Adelson et al. ............. 701/124 |
| 4,913,380 A | * | 4/1990 | Vardaman et al. ...... 244/135 R |
| 4,918,619 A | * | 4/1990 | Orloff et al. ................... 702/52 |
| 4,937,754 A | | 6/1990 | Buisson et al. |
| 4,949,269 A | | 8/1990 | Buisson et al. |
| 5,034,896 A | | 7/1991 | Orgun et al. |
| 5,321,945 A | * | 6/1994 | Bell .......................... 60/39.15 |
| 5,571,953 A | | 11/1996 | Wu |

* cited by examiner

Primary Examiner—J. Woodrow Eldred
(74) Attorney, Agent, or Firm—Koestner Bertani LLP; Ken J. Koestner

(57) ABSTRACT

A supersonic aircraft comprises a wing, a fuselage, a plurality of fuel tanks contained within the wing and/or fuselage, and a fuel transfer system communicatively coupled to the plurality of fuel tanks and capable of transferring fuel among the plurality of fuel tanks. The aircraft further comprises at least one sensor capable of indicating a flight parameter and a controller. The controller is coupled to the one or more sensors and to the fuel transfer system. The controller can transfer fuel among the plurality of fuel tanks and adjust the aircraft center of gravity to reduce trim drag and increase aircraft range.

20 Claims, 23 Drawing Sheets

AIRCRAFT WITH ACTIVE CENTER OF GRAVITY CONTROL

BACKGROUND OF THE INVENTION

The global economy makes long range business travel more essential than ever. However, other than Concorde, with presence declining as transatlantic flights have discontinued, the pace of business travel remains at 1960's-era speeds. Technology advances have produced longer range, safer, and more comfortable aircraft—but not faster flights.

Supersonic overland capability and range are drivers of market potential for aircraft in the commercial and business sector. Buyers of supersonic commercial aircraft are expected to be from entities such as corporations, governments and government agencies, and high net-worth individuals. Most operators are expected to be large organizations, for example corporations and governments, with sophisticated flight departments that can manage multiple aircraft types. Flights are expected to depart and arrive in a wide range of environments, from large international and national airports to small local airfields or suburban airports, with or without substantial service capabilities.

Although a supersonic aircraft for usage in commercial and business environments is to have many characteristics of a high-performance military aircraft, flight characteristics, operations, maintenance, and cost should be compatible to a business or commercial realm. The aircraft should be compatible with the infrastructure, servicing and operations experience base, and air traffic control system of the extant civil business jet.

The user community expects the aircraft to be usable not only in large, urban international hubs but also in suburban airports so that compatibility with shorter runway lengths, narrower taxiways, and lower maximum gross weight surfaces is desirable. Servicing and maintenance compatibility with personnel, equipment, and capabilities found at well-equipped fixed based operators (FBOs) and maintenance facilities is highly useful.

Many of the desirable features of supersonic civilian aircraft, particularly low-boom performance and long range, are very difficult to attain. Bill Sweetman in "Flights of fancy take shape—from Jane's (www.janes.com)", 21 Jul. 2000, discusses the United States Defense Advanced Research Projects Agency (DARPA) Quiet Supersonic Platform (QSP) program that is intended to develop an efficient supersonic-cruise aircraft that does not produce a sonic boom. The difficulty of such a result is indicated by the agency's admission that only a revolutionary design will meet the goal, and that incremental application of new technologies, or integration of existing technologies, is expected to be insufficient to attain the reduced boom goal.

Extension of aircraft range involves balancing of fuel capacity, payload volume, fuel consumption at desired speeds, aerodynamic, and other factors. Reduction of aerodynamic drag can assist in extending range, reducing sonic boom, and improving aircraft performance.

SUMMARY OF THE INVENTION

What are desired are an aircraft and constituent components that enable supersonic flight by applying new technologies and an innovative aircraft design approach. What is further desired is an aircraft that can significantly reduce travel times, for example by a factor of two through supersonic cruise speed capability, while retaining extending cruise ranges and spacious passenger comfort. In various embodiments, the speed advantage can be achieved with an environmentally-friendly design, compliant with takeoff and landing noise standards, engine emission requirements, and producing a very soft sonic signature during supersonic flight.

In accordance with some embodiments, a supersonic aircraft comprises a wing, a fuselage, a plurality of fuel tanks contained within the wing and/or fuselage, and a fuel transfer system communicatively coupled to the plurality of fuel tanks and capable of transferring fuel among the plurality of fuel tanks. The aircraft further comprises at least one sensor capable of indicating a flight parameter and a controller. The controller is coupled to the one or more sensors and to the fuel transfer system. The controller can transfer fuel among the plurality of fuel tanks and adjust the aircraft center of gravity to reduce trim drag and increase aircraft range.

In accordance with other embodiments, an automated fuel transfer system can be used in a supersonic aircraft. The aircraft includes a fuselage and wing. The automated fuel transfer system comprises a plurality of fuel tanks distributed within the wing and/or the fuselage, a plurality of pumps coupled to the plurality of fuel tanks and capable of transferring fuel among the plurality of fuel tanks, at least one sensor capable of indicating a flight parameter, and a controller. The controller is coupled to the sensors and the plurality of pumps, and transfers fuel among the plurality of fuel tanks to modify the aircraft lift distribution, thereby reducing or minimizing aircraft sonic boom.

According to further embodiments, an aircraft control system is used in a supersonic aircraft. The aircraft includes a fuselage and wing. The control system comprises a plurality of control effectors coupled to the wing, a plurality of fuel tanks distributed within the wings and/or the fuselage, a plurality of pumps coupled to the plurality of fuel tanks and capable of transferring fuel among the plurality of fuel tanks, and a plurality of actuators coupled to the control effectors. The control system further comprises at least one sensor capable of indicating a flight parameter, and at least one vehicle management computer coupled to the at least one sensor, the plurality of pumps, and the plurality of actuators. The vehicle management computer can manage the control effectors and transfer fuel among the plurality of fuel tanks to adjust aircraft trim and center of gravity position to operate the aircraft in at least two flight modes. The variable flight modes have different trim drag and sonic boom performance.

BRIEF DESCRIPTION OF THE DRAWINGS

Embodiments of the invention relating to both structure and method of operation, may best be understood by referring to the following description and accompanying drawings.

DETAILED DESCRIPTION OF THE EMBODIMENTS

An aircraft uses a set of sensors to indicate current and projected flight parameters of the aircraft during flight. The parameters are supplied to a computer or controller that executes an optimization algorithm to obtain an appropriate aircraft center of gravity to attain one or more objectives including: (1) reducing trim drag and thereby increase aircraft range, (2) changing the lift distribution to attenuate, reduce, minimize, or otherwise optimize aircraft sonic boom, (3) reducing the trim requirement to increase aircraft controllability, and (4) assisting in maintaining stability during flight. The optimal center of gravity for desired performance is attained by an automated system that actively transfers fuel among multiple aircraft internal fuel tanks.

Active center of gravity management is desirable, particularly in a supersonic aircraft, since the aircraft's aerodynamic center moves significantly from subsonic to supersonic flight regimes. Automated control of center of gravity management increases aircraft performance, stability, controllability, and reduces or minimizes sonic boom signature, while reducing workload and attention demands on the flight engineer or pilot. An automated system reduces demands on the pilot that may be overwhelming in some conditions if the system were manual. The automated center of gravity management system improves flight performance and flight safety while reducing aircraft operating costs.

Figure 1A:
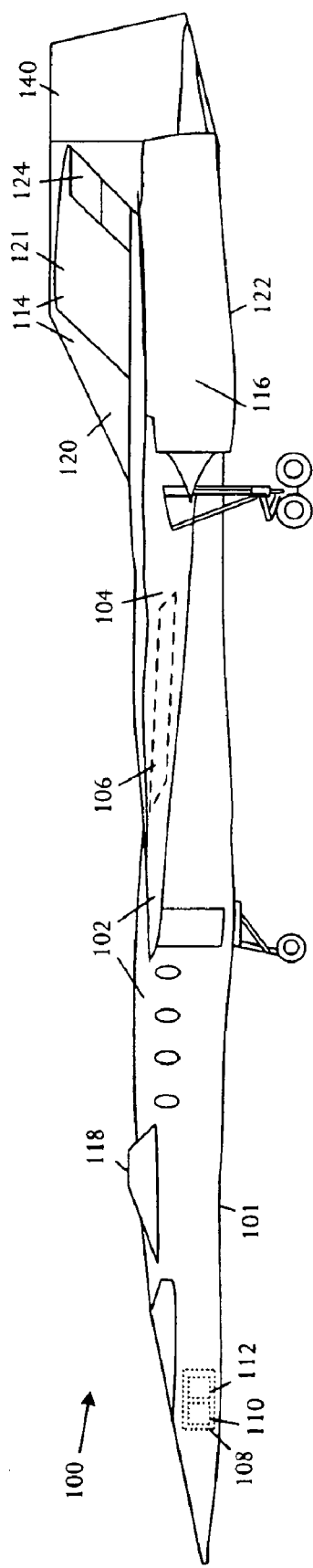
FIGS. 1A, 1B, and 1C are schematic pictorial diagrams that respectively illustrate side, front, and top views of an embodiment of a supersonic aircraft.
Figure 1B:
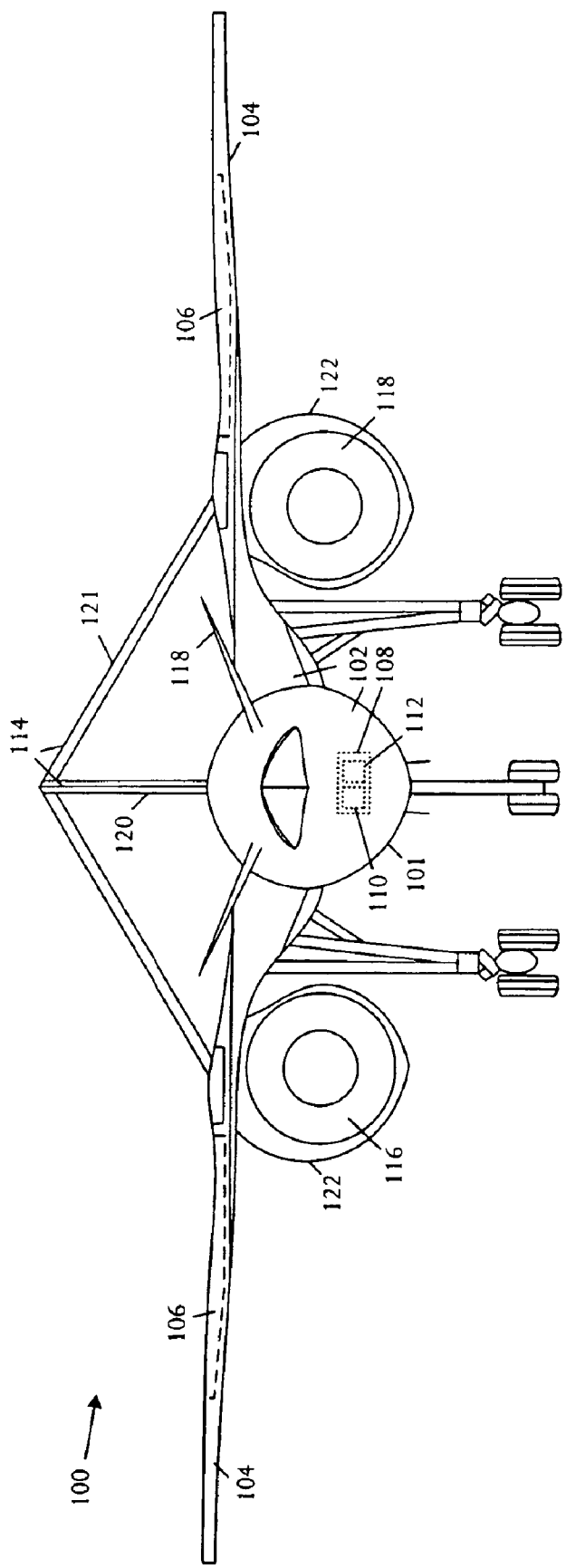
Figure 1C:
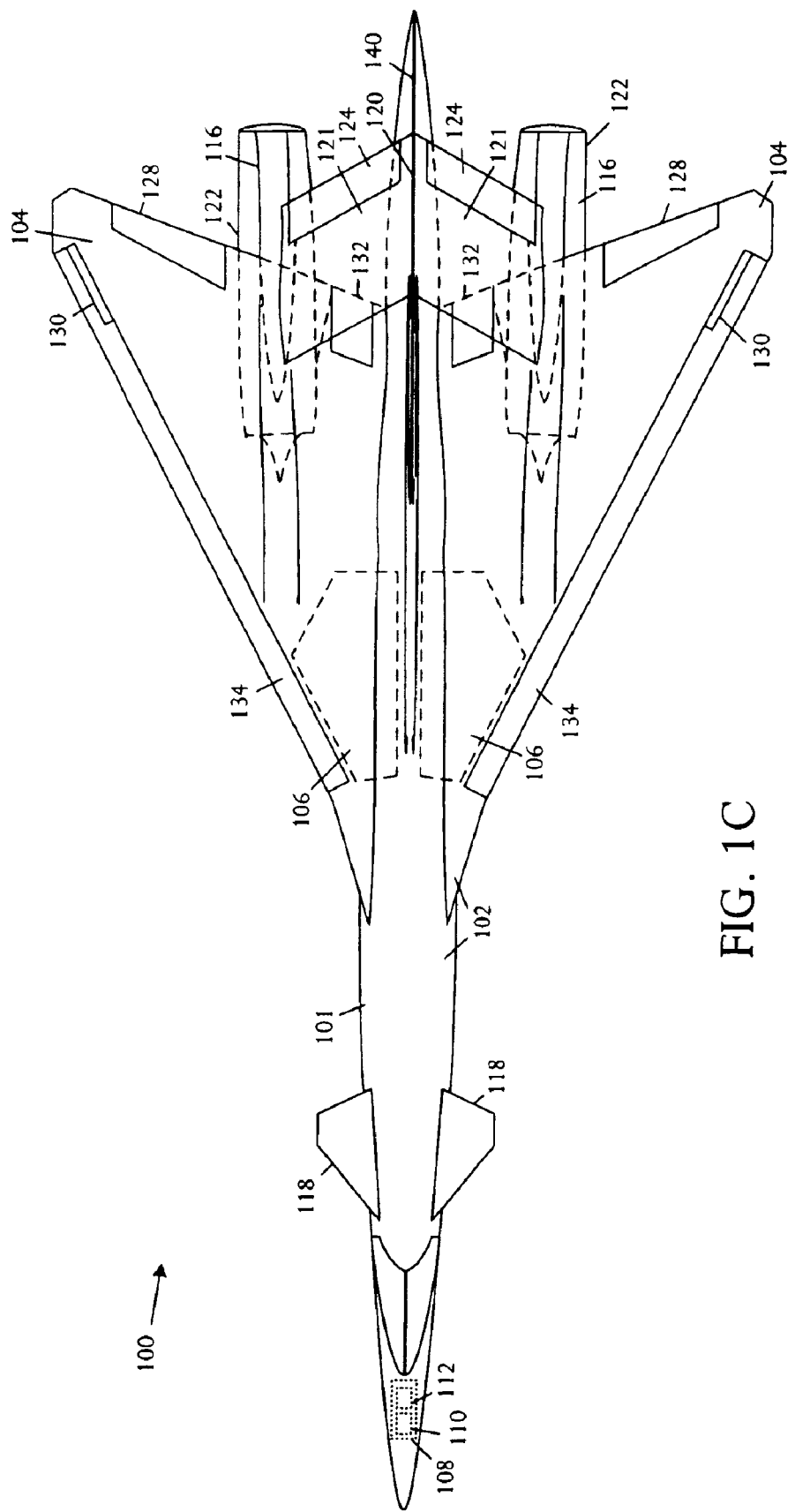

Referring to FIGS. 1A, 1B, and 1C, schematic pictorial diagrams respectively showing side, front, and top views of an embodiment of a supersonic aircraft 100. The supersonic aircraft 100 comprises an aerodynamic body 102, a plurality of fuel tanks 106 contained within the aerodynamic body 102, and a fuel transfer system 108 communicatively coupled to the plurality of fuel tanks and capable of transferring fuel among the plurality of fuel tanks 106. In an illustrative embodiment, the aerodynamic body 102 includes a fuselage 101 and a wing 104, and the plurality of fuel tanks 106 can be distributed in suitable areas of the fuselage 101 and wing 104. The aircraft further comprises at least one sensor 110 that is capable of indicating a flight parameter, and a controller 112. The controller 112 is coupled to the sensors 110 and to the fuel transfer system 108. The controller 112 can transfer fuel among the plurality of fuel tanks 106 and adjust the aircraft center of gravity to reduce trim drag and increase aircraft range.

The various sensors 110 indicate various flight parameters, current and/or projected. The sensors measure and supply one or more items of information selected from control effector positions and settings, aircraft angle of attack (a), weight, dynamic pressure, and the like. Side stick and rudder pedal controls can be connected to sensors to indicate pilot and copilot control of flight control surfaces from the flight deck. Sensors can also indicate positioning of dual rudder pedals with brake control for control of the rudder. In an illustrative embodiment, the rudder pedals can be adjusted individually and, for example, can have separate sensors to indicate settings. One or more sensors can be connected to a pitch trim control switch located on the stick controller to supply information indicative of lateral roll and directional yaw trim.

Sensors can be implemented within a flap control system that is indicative of flap position. An asymmetric brake can be installed on the ends of the flap drive system with a sensing device used to sense a predetermine condition and, in response, actuate the brakes in the event of a torque shaft failure.

The aircraft 100 can also include a aircraft status sensor or set of sensors capable of detecting establishment of takeoff climb conditions, and engine failure detectors respectively coupled to the at least two engines and capable of detecting engine failure. For example, sensors 110 can be included for detecting various control parameters such as engine speed or Mach number, engine inlet temperature, engine revolutions per minute, engine inlet pressure, weight on wheels, and others.

Sensors 110 indicate status of the aircraft, for example whether the aircraft has established takeoff climb conditions. Status sensors 110 are used in the illustrative embodiment to automatically control takeoff thrust. The sensors 110 can also be used to detect status for purposes of stability augmentation for pitch handling during flight, and for proper elevator adjustment.

In various embodiments, different sensors 110 and sensor combinations can be used. A highly useful status sensor is a weight-on-wheels detector. A typical weight-on-wheels detector uses one or more strain gages mounted on landing gear posts to determine whether a force is above or below a predetermined threshold force indicative of aircraft contact with the ground. Other typical weight-on-wheels detectors use position sensors or switches to detect compression of the landing gear as it supports the aircraft weight.

Other embodiments may supplement or replace the weight-on-wheels detector with other sensors 110. A landing gear truck attitude sensor can detect truck angle relative to landing gear posts, monitoring for an upward swinging tilt of the gear indicative of takeoff or a downward shift of the gear truck at touchdown.

Some embodiments may use other or additional sensors for redundancy and self-checking. Multiple or dual sensors may improve reliability by avoiding false positive and false negative indications.

The set of sensors 110 indicate current and/or projected flight parameters of the aircraft 100 during operation. The controller 112 uses the parameters in a control process to obtain an appropriate center of gravity location for the aircraft to: (1) reduce trim drag and thereby increase aircraft range, (2) modify lift distribution to minimize or reduce sonic boom, (3) reduce the trim criteria to increase aircraft controllability, and (4) assist in maintaining stability during flight. The controller 112, upon determining the appropriate center of gravity location, actively transfers fuel among the aircraft's multiple fuel tanks 106 to automatically change the aircraft center of gravity to the determine location.

For example, the controller 112 can transfer fuel among the plurality of fuel tanks 106 to adjust the aircraft center of gravity to modify the aircraft lift distribution to reduce or minimize the aircraft sonic boom by pumping fuel to a maximum aft position. Moving the center of gravity aft trims the aircraft for a low sonic boom condition without significant trim drag penalty. Accordingly, the controller 112 is capable of transferring fuel among the plurality of fuel tanks 106 to adjust the aircraft center of gravity and thus the aircraft longitudinal lift distribution throughout the flight envelope to maintain a low-boom, low-drag trim condition. Similarly, the controller 112 can transfer fuel among the plurality of fuel tanks 106 to adjust the aircraft center of gravity to a more aft location to reduce trim criteria to increase aircraft controllability.

In another example, the controller 112 can transfer fuel among the plurality of fuel tanks 106 to adjust the aircraft center of gravity laterally in the event of an engine failure that tends to pull the aircraft 100 to one side to help maintain aircraft stability and controllability during flight. The controller 112 transfers fuel among the plurality of fuel tanks 106 to adjust the aircraft center of gravity in compliance with control laws to stabilize the aircraft 100 and provide satisfactory handling qualities to a pilot by evaluating closed-loop aircraft responses to atmospheric disturbance. The illustrative aircraft has an empennage 114 in the form of an inverted V-tail that includes a vertical stabilizer 120 and inverted stabilizers 121.

Referring to FIG. 1C, control effectors that are controlled in combination with center-of-gravity control are shown for the supersonic aircraft 100. Two sets of surfaces are available for pitch control including the canards 118 and ruddervators 124. Roll control uses ailerons 128 and high speed spoilers 130. Yaw control is supplied by a rudder 140, ruddervators 124, and differential canard 118.

In combination with the canards 118, the supersonic aircraft 100 has multiple stability and control effectors. The canard 118 and symmetric defections of the ruddervators 124 control pitch power. A vertical rudder 140 controls yaw. Inboard, midboard and outboard ailerons 128, and the high speed roll spoilers 130 control roll. The segmented ailerons 128 provide both roll control power and automatic wing camber control to optimize lift and drag throughout the flight envelope. The roll spoilers 130 are configured to control roll at supersonic Mach numbers. High-speed spoilers 130 supplement aileron roll power at transonic and supersonic speeds where Mach number and aeroelastic effects reduce aileron effectiveness.

In an illustrative embodiment, trailing edge (TE) flaps 132 are deployed to generate additional lift during landing. TE flap deployment reduces angle-of-attack specifications during landing. During second-segment climb, the TE flaps 132 are extended to improve the lift-to-drag ratio for better climb performance. Leading edge (LE) Krueger flaps 134 are extended for low speed operations including takeoff, approach and landing. The LE Krueger flaps 134 improve lift-to-drag ratio, resulting in better climb performance that facilitates second-segment climb in case of engine malfunction. In some embodiments, the aircraft 100 can be configured with a high lift system that includes simple inboard trailing edge flaps 132 and a full-span leading edge Krueger flaps 134. Aircraft center-of-gravity can be controlled concurrently with the TE flaps 132 and Krueger flaps 134 to move the center-of-gravity more aft during supersonic operation and more forward during takeoff, approach, and landing.

The multiple control surfaces of the supersonic aircraft 100, for example the ruddervators 124 inboard and outboard design, enable continued operation and landing following single actuator failure or a single control surface jamming. Differential canard deflection can generate a yawing moment to counter a jammed rudder. Ailerons 128 and ruddervators 124 include multiple surfaces, increasing fault tolerant capability and supplying redundant elements for improved reliability.

Referring again to FIGS. 1A, 1B, and 1C, in the illustrative aircraft 100, shaping of the wing 104, body 101, empennage 114, and the integration of the propulsion system 116 are configured to produce a shaped sonic signature and control supersonic cruise drag. An inverted V-tail geometry 114 facilitates the overall low-boom design and supports nacelles 122 in an appropriate position relative to the wing 104, as well as enabling for trim to attain a low sonic-boom lift distribution. Inverted V-tail control surfaces, called ruddervators 124, adjust the aircraft longitudinal lift distribution throughout the flight envelope to maintain a low-boom, low-drag trim condition. The canard 118 supplies additional trim control and augments longitudinal control power.

In various embodiments, the illustrative aircraft 100 may include one or more of several advancements including addition of an all-flying canard 118, an optimized wing 104, incorporation of leading edge flaps 134 and spoilers 130, and a reconfigured body or fuselage 101. The canard 118 improves takeoff rotation and high-speed control. Wing planform and airfoil shapes are configured to assist high-speed performance, low-speed performance, low sonic boom, stability and control, and structural mass fraction characteristics. Sizes of the inverted V-tail 114 and fins can be configured to improve both structural and aerodynamic integration, benefiting both weight and drag characteristics. Flaps 134 improve takeoff performance. Spoilers 130 assist high-speed roll control.

The illustrative aircraft 100 has a twin-engine, slender-body configuration with a highly swept low aspect ratio wing 104, a configuration highly appropriate for low-boom performance. The aft engine location beneath the wing 104, in combination with a highly integrated wing/inlet geometry, produces both low-boom compatibility and low inlet/nacelle installation drag. The inverted V-tail geometry 114 supplies both a low sonic-boom performance while generating longitudinal trim in cruise, and structural support for the engine/nacelle installation.

Some embodiments of the aircraft 100 implement one or more of several features including a multi-spar wing 104, a fuselage structure 101 with stringer-stiffened skins supported by frames, canards 118 that are integrated with the pressurized fuselage cabin structure, and aft-located engines 116 supported by a torque-box structure that extends aft of the wing 104 and is attached to the inverted V-tails 114.

Referring to FIGS. 2A, 2B, 2C, and 2D in combination with FIGS. 1A, 1B, and 1C, a group of schematic pictorial diagrams illustrate multiple aspects of an automated fuel transfer system 200 that can be used in a supersonic aircraft 100. The aircraft 100 includes a fuselage 101 and wing 104. The automated fuel transfer system 200 comprises a plurality of fuel tanks 202 distributed within the wing 104 and/or the fuselage 101, a plurality of pumps 204 coupled to the plurality of fuel tanks 202 and capable of transferring fuel among the plurality of fuel tanks 202, at least one sensor 110 capable of indicating a flight parameter, and a controller 112. The controller 112 is coupled to the sensors 110 and the plurality of pumps 204, and controls fuel transfer among the plurality of fuel tanks 202 to modify the aircraft lift distribution, thereby reducing or minimizing aircraft sonic boom.

Figure 2A:
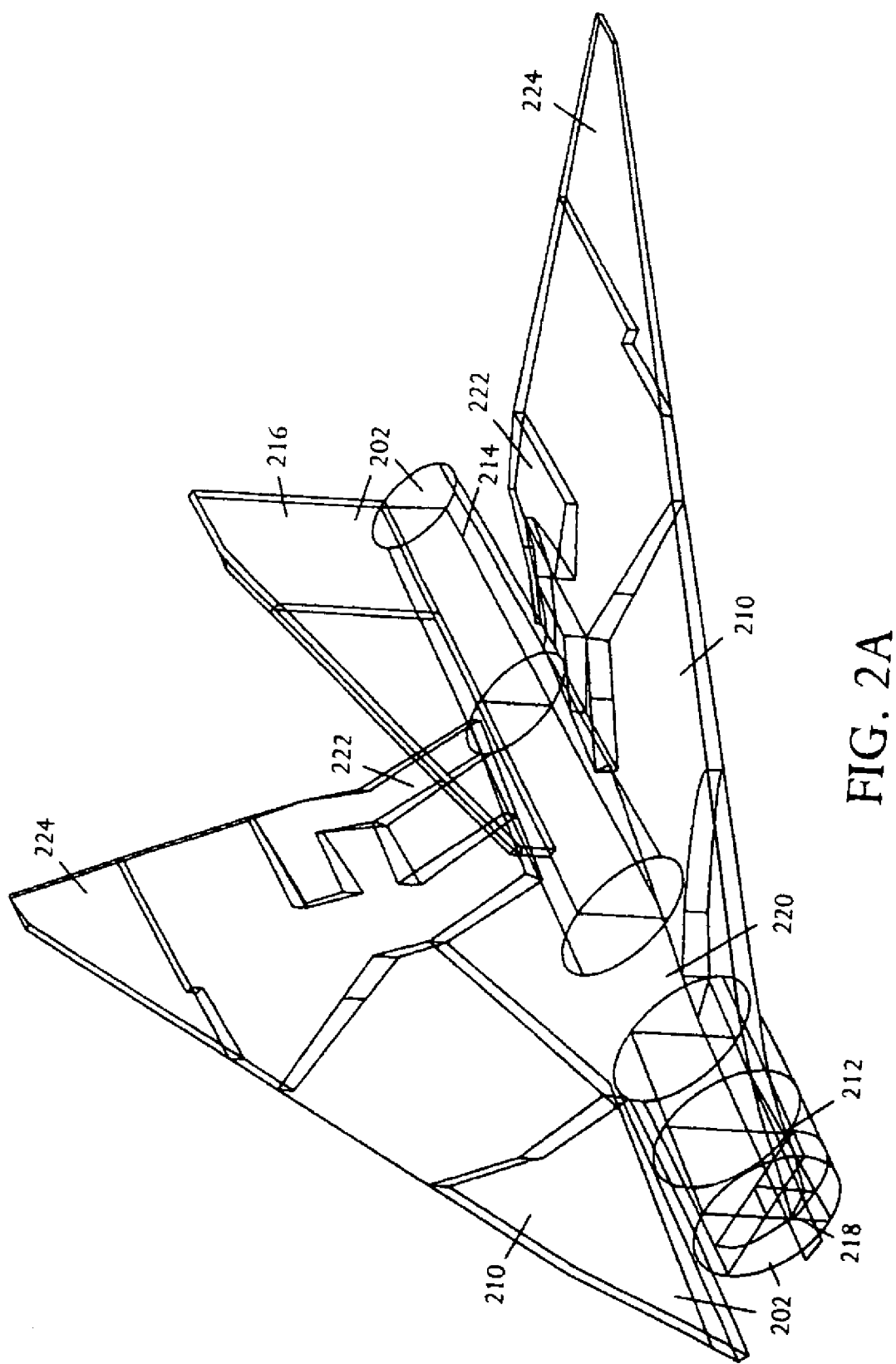
FIGS. 2A, 2B, 2C, and 2D are a group of schematic pictorial diagrams showing multiple aspects of an automated fuel transfer system.

FIG. 2A is a perspective view of a fuel tank arrangement in a system embodiment, showing an example of positioning and capabilities of the tanks. The fuel tanks 202 include wing tanks 210, a forward fuselage tank 212, an aft fuselage tank 214, and a vertical tail tank 216. The fuel tanks 202 are divided into left and right tanks by a center keel 218 inside the forward 212 and aft 214 fuselage tanks. The forward 212 and aft 214 fuselage tanks are separated by the landing gear bay 220. The illustrative system 200 includes two feed tanks 222, one vent tank 224, and one dry bay (not shown) for the left and right fuel tanks respectively. In the example, vent tanks 224 are located on the outer edge of each wing 104. In other embodiments, for example for configurations in which fuel is carried in the vertical tail 120, the vent tanks 224 may be in another position.

In an illustrative embodiment, the fuel system 200 has three component subsystems including a feed system, a refuel/defuel system and a vent/pressure system. The fuel system supplies and delivers an appropriate fuel amount to aircraft main engines and an Auxiliary Power Unit (APU) for a flight mission. In the illustrative embodiment, the fuel system 200 includes four major fuel tanks, pumps, valves and tubing connections between the fuel tanks, engines and the APU. The forward body fuel tank 212 is located between the nose landing gear wheel well and the main landing gear wheel well. The aft body fuel tank 214 is located between the main landing gear wheel well and the APU. The left and right wing fuel tanks 210 are located from the wing root out to the wing tip of each wing 104. The vertical tail fuel tank 216 can operate as a fuel tank and can be plumbed into the aft body fuel tank 214.

The fuel feed system 200 can supply a substantial fuel flow to each engine 116 for takeoff using two pumps per side at sea level and standard conditions. The fuel transfer system 200 can jettison a substantially larger amount of fuel, if desired. The fuel transfer system 200 enables center of gravity control for selected conditions including emergency flight scenarios. The re-fueling system assists rapid refueling of an aircraft, even if the tanks are fully empty, within a short time using multiple fuel trucks. The fuel feed system 200 incorporates feed tanks 202 that can supply a small amount of fuel to the engine 116 from the forward or aft feeder tank 222 without increasing pump power. The fuel vent system pressurizes the fuel tanks with nitrogen enriched air and maintains constant fuel tank pressure while the outside air pressure is changing due to changes in altitude.

The total fuel volume is the sum of the volumes in the forward body 212, aft body 214, left wing 210, right wing 210, and vertical tail 216 fuel tanks. Fuel tank partitions separate fuel tanks in the wing, the body and the vertical tail. A vertical keel partition separates the left side and the right side of both the forward body 212 and aft body 214 fuel tanks.

Figure 2B:
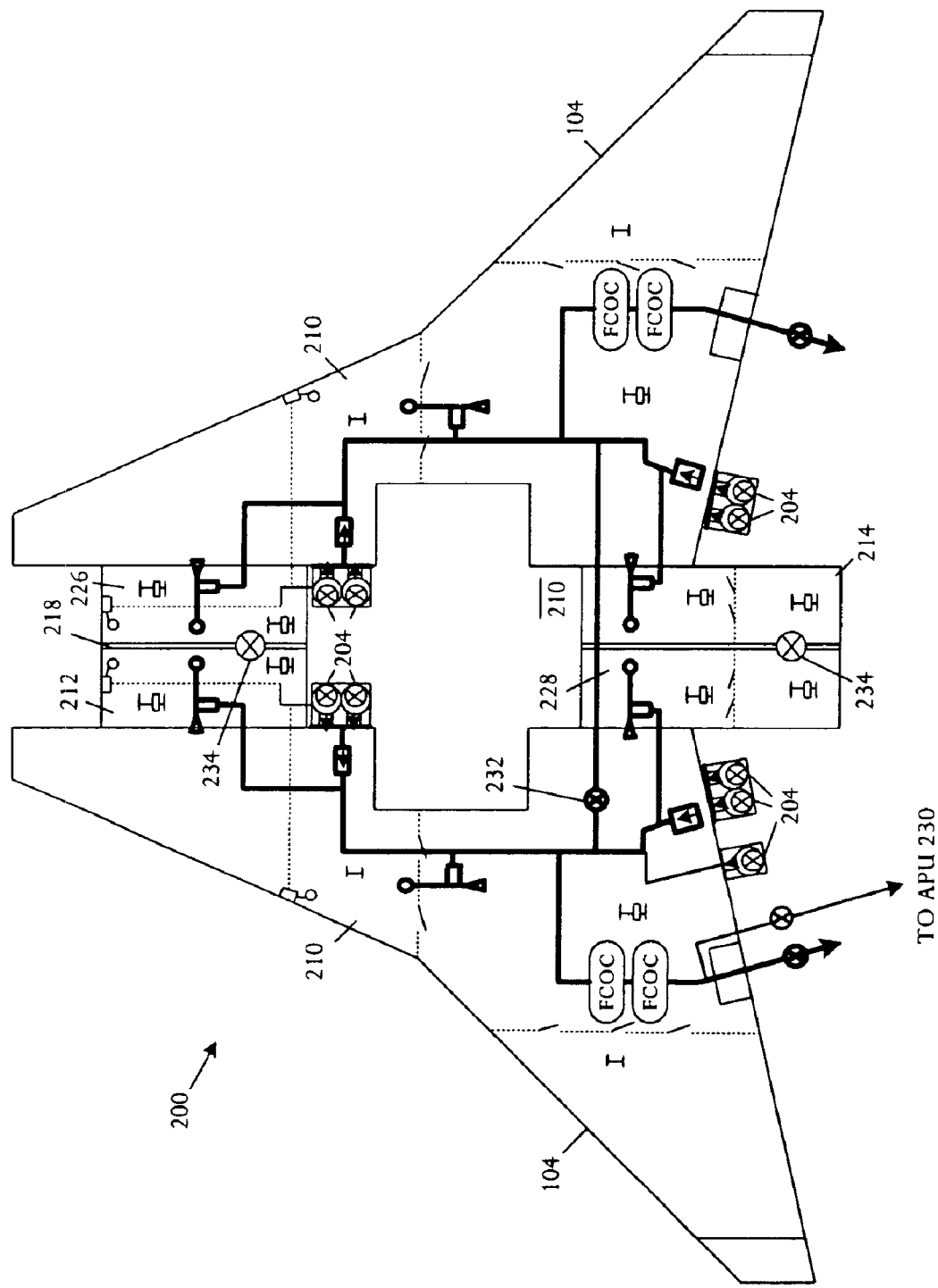

FIG. 2B is a schematic block diagram of the fuel feed system 200 showing a pair of fuel feed pumps 204 in a forward feed tank 226 and a pair 204 in the aft feed tank 228 to supply fuel to each engines 116 and to the APU 230. Ejector pumps and fuel feed lines are integrated to supply fuel to the engines 116 and the APU 230. The fuel system 200 enables fuel from each tank to be burned in sequence to control aircraft center of gravity. Most fuel system components are positioned inside the tanks 202. Boost pumps 204 are located outside the tanks 202 to facilitate accessibility and maintenance without defueling the aircraft 100. Dual boost pumps 204 in the forward 226 and aft 228 fuselage feed tanks generate fuel flow. Fuel from the forward fuselage tank 212 is supplied to each engine 116 first to begin shifting the aircraft center of gravity aft in preparation for supersonic flight. Once fuel in the forward fuselage tank 212 is consumed to a predetermined level, the aft fuselage dual boost pumps 204 continue supplying fuel to respective engines 116. A fuel scavenge system removes the remaining fuel in the forward tanks 212. A cross feed valve 232 connects the left and right fuel feed manifold 218 in the event of total fuel failure on either side. An intertank shut off valve 234 between the forward 212 and Aft 214 fuselage tanks transfers fuel from one side to the other during the flight in response to fuel imbalance.

The fuel feed system 200 has ejector pumps 204 that assist fuel transfer from forward section to the middle section of the wing fuel tank 210, from the middle section to the aft section, from the aft section of the wing tank 210 to the aft feed tank 214, from the aft body front tank to the aft feed tank and from the forward body front tank 212 to the forward feed tank. One-way flapper valves in the fuel tank partitions enable fuel to flow in the same direction as the ejector pumps transfer fuel. One-way flapper valves are also located in the forward and aft body partitions, enabling fuel to flow from the rear part to the front part of both body tanks 212 and 214. Both fixed and movable capacitance probes are located in the wing fuel tanks 210 and indicate fuel level in each fuel compartment. Float switches at the forward body tank deactivate the forward feed pump and activate the aft feed pump when fuel levels are low in the forward body tanks.

The fuel feed system 200 has independent left and right side systems to feed fuel through fuel lines from the forward 212 and aft 214 fuel tanks to the engines 116. The fuel feed for the Auxiliary Power Unit (APU) 230 is from the left side feed system through a feed line. Two fuel-to-hydraulic heat exchangers are located in each of the aft body fuel tanks 214. A left to right cross feed shut off valve 234 is located between the right aft feed pumps and left aft feed pumps. When the cross feed valve 234 is in the open position, cross feed of fuel from either the left or right feed pumps can occur. One-way check valves in the outlet of each feed pump 204 to prevent back flow of fuel from other feed pumps.

Figure 2C:
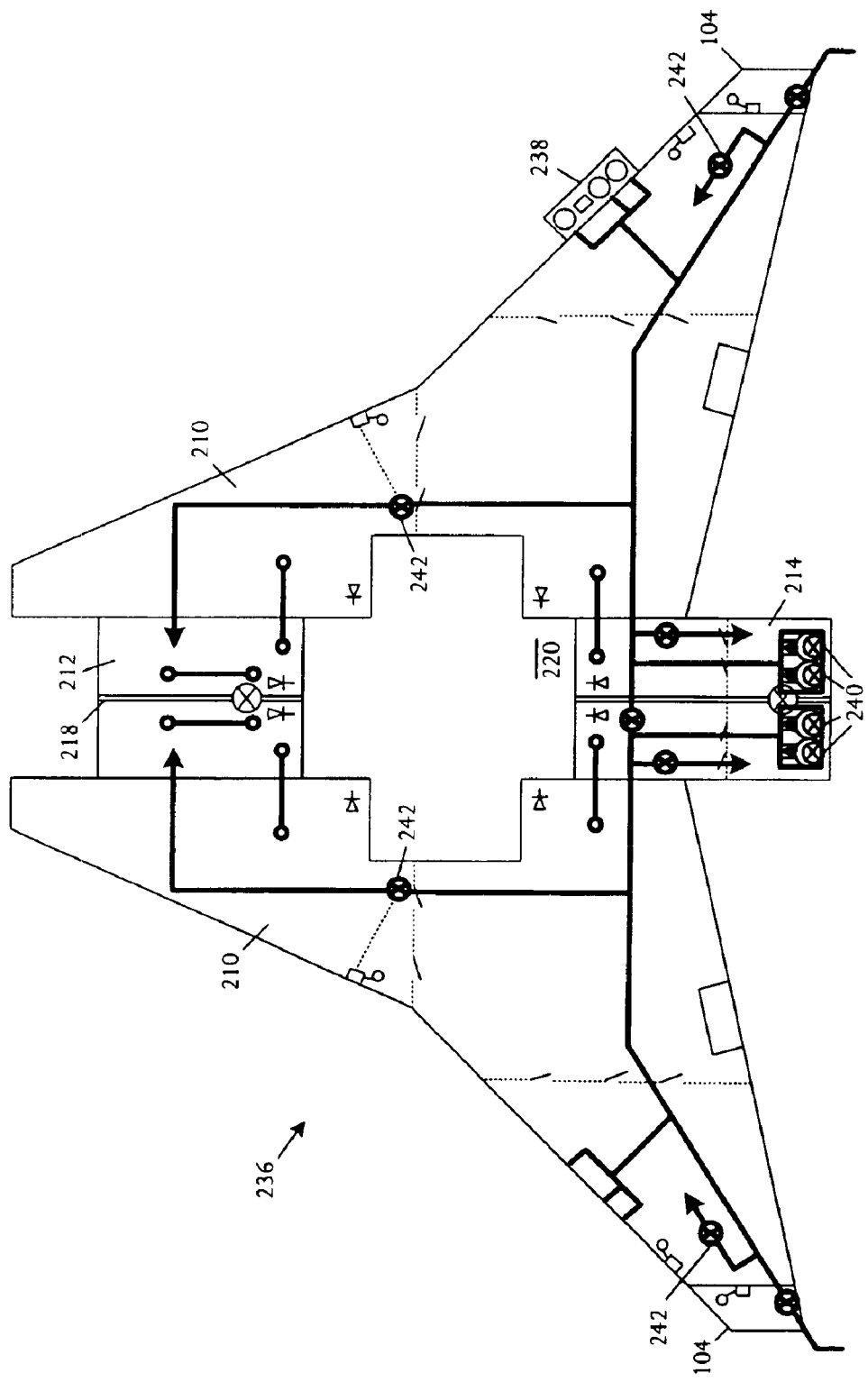

FIG. 2C shows a schematic block diagram of a refuel/defuel system 236 including re-fueling and de-fueling receptacles 238 located in the right outboard wing lower leading edge. Four fuel transfer pumps 240 are located at the rear body tank 214. Each fuel transfer pump 240 can transfer a substantial flow rate from the aft tank 214 to either of wing tanks 210, the forward body tank 212, or jettison the fuel overboard. In an illustrative embodiment, the re-fuel and de-fuel system 236 is integrated into the aircraft with appropriate sizing for rapidly refueling the aircraft with reasonable turnaround time for re-fuel operations using a commercially available fuel source and fuel handling support equipment. The refuel/defuel system includes a jettison capability.

In the illustrative aircraft 100, the refuel/defuel station 238 has two refueling and one defueling receptacle. The system 236 has one fuel valve 242 for the forward 212, aft 214, and wing 210 tanks. The aircraft refueling system 236 refuels the fuel tanks sequentially. Refueling begins with the forward fuselage tank 212. Once the forward fuselage tank 212 is full, fuel begins spilling to the forward wing tanks 210 through standpipes. The aft fuselage tank 214 beings filling next and, when full, fuel spills to the wing tanks 210. Wing tanks 210 are the last tanks to refuel. A fueling float switch in the wing tank 210 automatically closes the fueling valve when the fuel quantity reaches capacity. Receptacles are spaced such that two fuel trucks can supply fuel to the aircraft simultaneously.

The defuel system enables removal of fuel from each tank and enables transfer of fuel between tanks on the ground. The fuel boost pumps 204 are used to get fuel out of the tanks 202 and into the feed manifold. With the defuel valve open, fuel transfers to the defuel station.

The transfer system transfers fuel from the aft fuselage tanks 214 to the forward fuselage tanks 216. The transfer system is configured and sized to transfer fuel forward during supersonic to subsonic transition and dual engine flame out where the center of gravity is modified to control the aircraft 100.

Figure 2D:
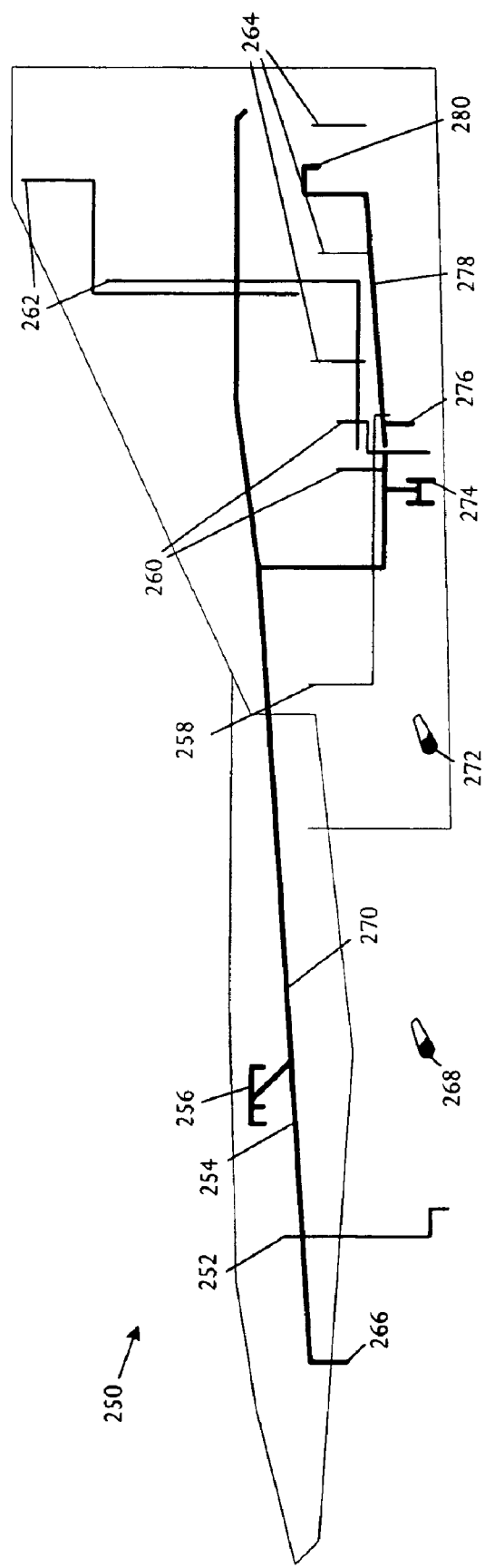

FIG. 2D is a side pictorial view of the aircraft 100 showing the aircraft fuel envelope profile 250. The fuel system 200 has multiple fuel tank spillover lines including a forward body tank spill-over line 252, aft body tank spill-over line 260, and vertical tail vertical tail tank spill-over 262 which allow fuel from one tank with a supply spout to flow to the adjacent fuel tank.

Fuel from the vertical tail fuel compartments 216 flow to the aft body rear fuel compartment 214 by gravity drains, the vertical tail to body tank feed lines 258 and 264. Two fuel transfer pumps per side, for example the illustrative left aft body transfer pumps 274, are located in the aft body front fuel compartment. Each transfer pump can transfer fuel at a substantial rate to the forward body front fuel compartment 212, the aft wing fuel compartment 210, or jettison fuel out aft of the wing rear spare.

Fuel can be transferred from the forward 212 and aft 214 body fuel tanks to other fuel tanks with a spout, specifically the forward body tank transfer line and spout 266, the aft body tank spout 276, and the vertical tail tank transfer line and spout 280. A shut off valve in each spout, in particular the forward body tank transfer shut-off valve 254, the forward inter-tank shut-off valve 268, the aft inter-tank shut-off valve 272, and the vertical tail tank transfer shut-off valve 278, enables fuel to be transferred to the tank with the shut off valve in the open position. The fuel transfer line 270 carries fuel throughout the aircraft 100. FIG. 2D also shows the refuel and defuel panel 256.

The controller 112 transfers fuel among the plurality of fuel tanks 202 to adjust the aircraft center of gravity so that fuel in the forwardmost tanks is consumed first, configuring the aircraft trim on attaining cruise condition at a maximum aft center-of gravity for a reduced sonic boom condition.

Referring again to FIGS. 1A, 1B, and 1C, and FIGS. 2A, 2B, 2C, and 2D, the schematic pictorial and block diagrams illustrate a control system that can be used in a supersonic aircraft 100. The aircraft 100 includes a fuselage 101 and wing 104. The control system comprises a plurality of control effectors coupled to the wing 104, a plurality of fuel tanks 106 distributed within the wing 104 and/or the fuselage 101, and a plurality of pumps 204 coupled to the plurality of fuel tanks 202 and capable of transferring fuel among the plurality of fuel tanks 202. In the illustrative embodiment, the control effectors include canards 118, ruddervators 124, ailerons 128, high speed spoilers 130, and rudder 140. The system further comprises a plurality of actuators coupled to the control effectors, at least one sensor 110 capable of indicating a flight parameter, at least one vehicle management computer 112 coupled to the sensors 110, the plurality of pumps 204, and the plurality of actuators. The vehicle management computer 112 can manage the control effectors and transfer fuel among the plurality of fuel tanks 202 to adjust aircraft trim and center of gravity position to operate the aircraft 100 in at least two flight modes. The variable flight modes have different trim drag and sonic boom performance.

The vehicle management computer or computers 112 can operate the aircraft 100 in a maximum range, maximum Mach over water mode with control effectors deployed for relatively reduced trim drag and center of gravity positioned relatively forward. In another mode, the vehicle management computers 112 can operate the aircraft 100 in a slightly reduced range, relatively lower Mach over land mode with control effectors deployed for a slight increase in trim drag and center of gravity positioned relatively aft to attain suitable aerodynamics at a reduced sonic boom level.

In some embodiments, the vehicle management computer or computers 112 can control the fuel tanks 202 to burn in sequence for aircraft center of gravity so that fuel in the forwardmost tanks is consumed first, and configuring the aircraft trim on attaining cruise condition at a maximum aft center-of-gravity for appropriate aerodynamic flight at an attenuated sonic boom condition.

In some embodiments, the aircraft 100 has multiple fuel boost pumps 204 positioned outside of the fuel tanks 202 for the ease of accessibility and maintenance without defueling the aircraft. The fuel boost pumps include dual boost pumps in forward and aft fuselage feed tanks 202. Fuel from the forward fuselage tank is supplied to engines 116 first to begin shifting the aircraft center of gravity aft in preparation for supersonic flight. When fuel in the forward fuselage tank is consumed to a predetermined level, aft fuselage dual boost pumps continuing supplying fuel to the engines 116.

In some embodiments, the aircraft 100 can comprise a fuel scavenge system that removes remaining fuel in fuel tanks using a cross feed valve connecting left and right fuel feed manifold in the event of total fuel failure on either side. An intertank shut off valve between forward and aft fuselage tanks for transferring fuel from one side to the other during the flight due in case of fuel imbalance.

In a particular embodiment, the vehicle management computer or computers 112 can perform multiple fuel management operations, many of which affect or control center of gravity. In one operation, the computers 112 transfer fuel among the plurality of fuel tanks to adjust the aircraft center of gravity to adjust the aircraft center of gravity and reduce trim drag, increasing aircraft range. Management of center of gravity can be used to adjust the aircraft center of gravity to reduce trim criteria to increase aircraft controllability. Adjusting center of gravity is performed to maintain aircraft stability during flight. In some examples, adjusting aircraft center of gravity can be used to adjust the aircraft longitudinal lift distribution throughout the flight envelope to maintain a low-boom, low-drag trim condition.

Figure 3:
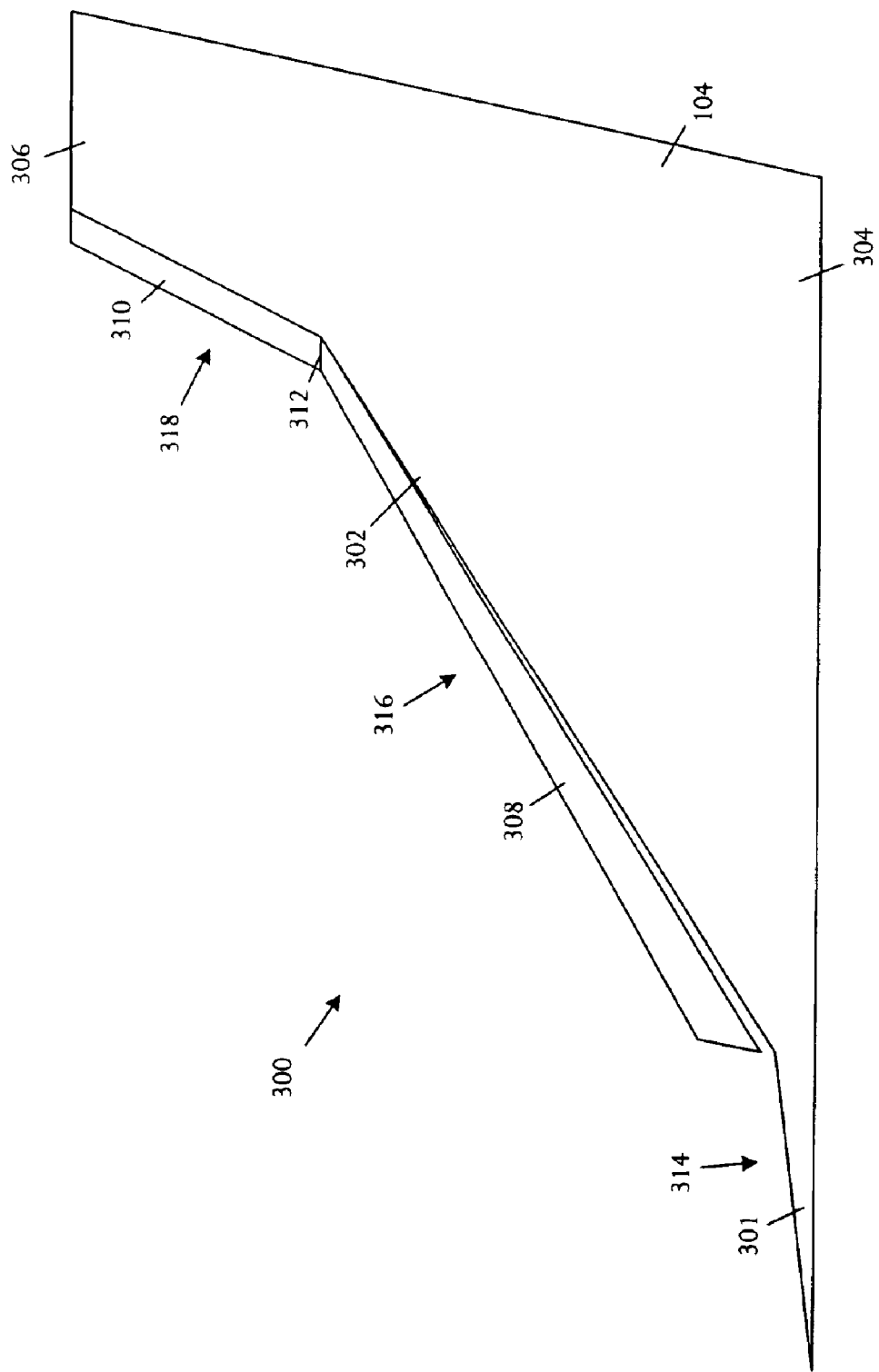
FIG. 3 is a schematic block diagram that illustrates an embodiment of an aircraft lift device including control actuators that can be operated in combination with center of gravity management to control the aircraft.

Referring to FIG. 3, a schematic block diagram illustrates an embodiment of an aircraft lift device 300 including control actuators that can be operated in combination with center of gravity management to control the aircraft. The aircraft lift device 300 comprises an aircraft wing 104 that can mount onto an aircraft fuselage. The aircraft lift device 300 has a leading edge 302 extending along the wing inboard 304 to outboard 306, and a strake 301 that can couple to the aircraft fuselage and extend from the fuselage to the leading edge 302 of the wing 104. In the illustrative embodiment, the leading edge 302 is formed as a Krueger flap 308 that is outboard of the strake 301 and inboard of a simple flap 310. The Krueger flap 308 and the simple flap 310 generally have different leading edge structures. In other embodiments, the entire leading edge may be a single structure or may have multiple leading edge segments. For example, in some embodiments, the Krueger flap 308 can extend from the strake 301 to the wing tip. The aircraft lift device 300 further comprises a Krueger flap 308 coupled to the leading edge 302 at a relatively inboard portion of the wing adjacent the strake 301, and a simple leading edge flap 310 coupled to the leading edge 302 of the wing 104 and extending from a junction 312 at the Krueger flap 308 to an outboard portion 306 of the wing 104.

The aircraft uses the active center-of-gravity (CG) management system in combination with the control effectors. As fuel is burned throughout the mission, the CG management system redistributes the remaining fuel to maximize range and minimize sonic boom signature. The CG management system enables the canard, wing and inverted V-tail to work in harmony to lift the vehicle efficiently for maximum range while producing a low sonic boom signature. In operation, the leading edge flaps, including the Krueger flaps 308 and the leading edge flaps 310, are extended for low speed operations during takeoff, approach, and landing while the CG management system positions the center-of-gravity in a relatively forward position in comparison to the aft position during supersonic flight that reduces sonic boom level.

Figure 4A:
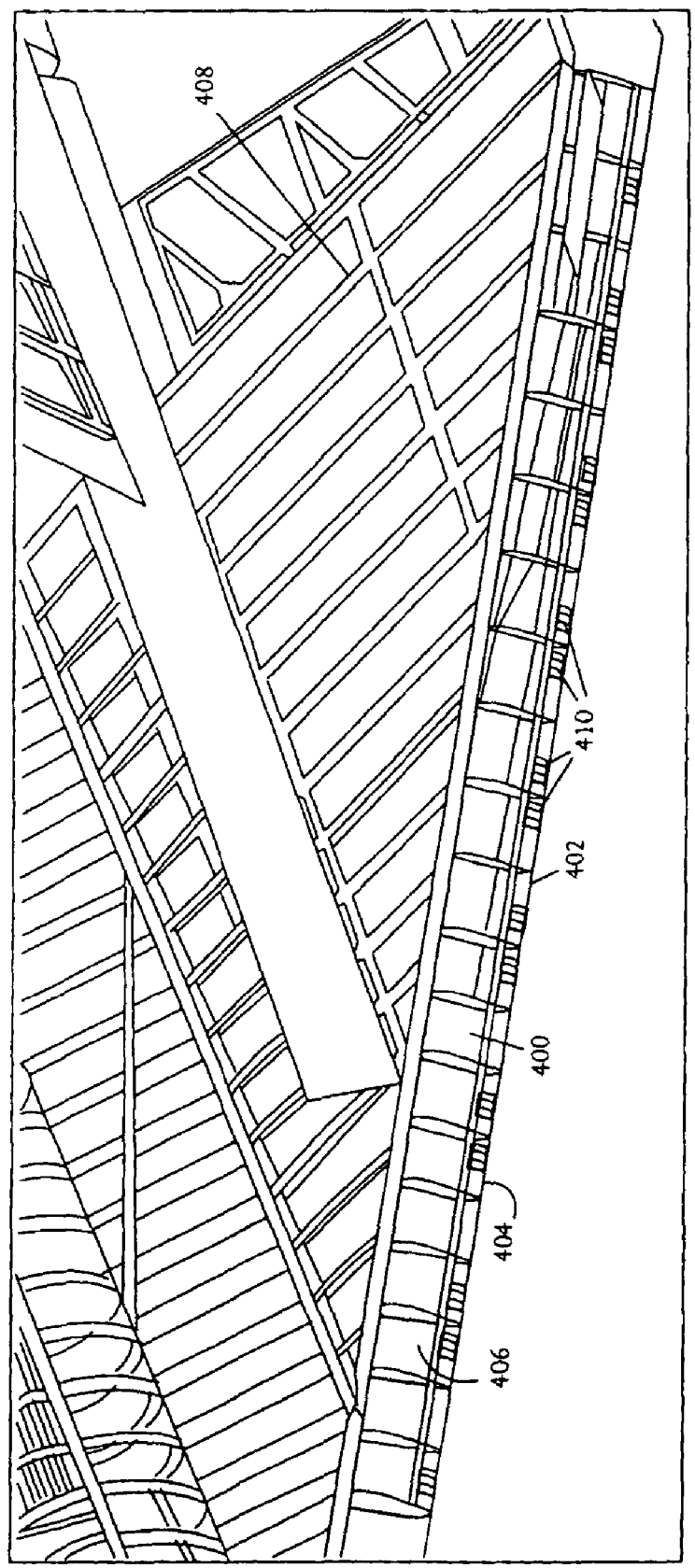
FIGS. 4A and 4B are schematic pictorial diagrams showing an embodiment of a Krueger flap that can be controlled in combination with center of gravity management to control the aircraft.
Figure 4B:
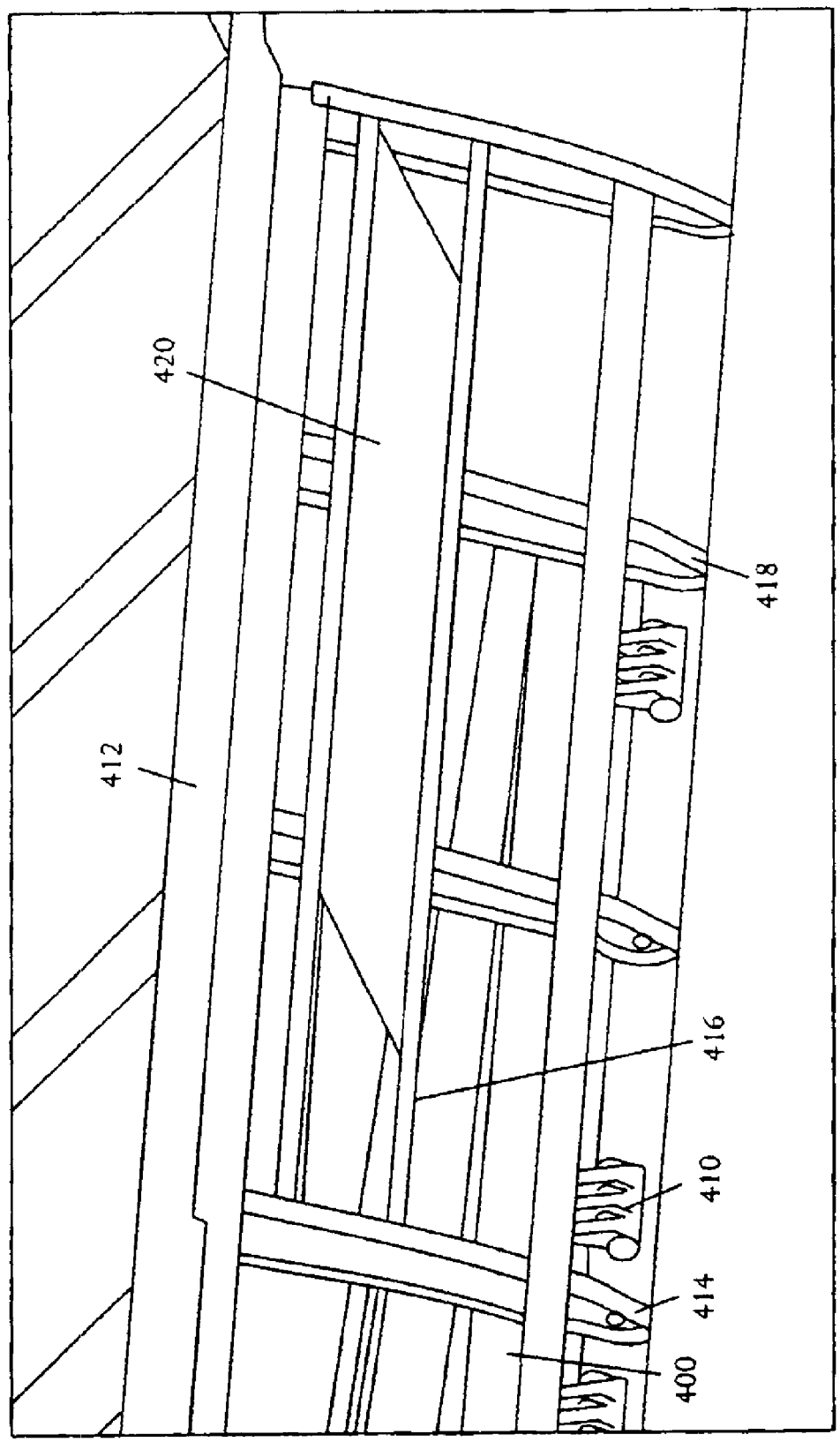

Referring to FIGS. 4A and 4B, two schematic pictorial diagrams show an embodiment of a Krueger flap 400 that can be controlled in combination with center of gravity management to control the aircraft. Krueger flaps 400 are aerodynamically-effective movable components on the leading edge of the airfoil, high-lift devices that supply additional lift in certain configurations and under certain flight attitudes. Krueger flaps 400 are connected to the leading edge 402 of the wing 408 and extend from the wing lower surface 404 to increase lift capability during low-speed operation. High-lift devices, such as Krueger flaps 400, facilitate lift-off and landing at low speeds, and maintain undisturbed wing root airflow over the wing upper surface 406 without separation at the transition from fuselage to wing 408.

From the stowed position, the rotary actuators 410 can rotate the Kruger flap 400 downward and forward from the lower surface 404 of the wing 408. The illustrative Krueger flap 400 shows one example of a suitable rotary actuator 410 that is suitable for usage in a wing 408 or other airfoil. In general, any Krueger flap with appropriate configuration, aerodynamic configuration, and actuating mechanism can be used. Generally, a suitable Krueger flap has an actuating mechanism capable of forming the wing leading edge configuration into a rigid airfoil structure at multiple different operating positions maintaining short and efficient load paths. Furthermore, a suitable Krueger flap has a control linkage mechanism that is stable at the different operating positions and deflects downward when actuated through a range of selected rotational angles while maintaining a substantially smooth wing surface with an aerodynamic, relatively constant radius of curvature. The actuating linkage operates to controllably stow and deploy the flap 400 during takeoff and landing, and for usage as a speed brake, if desired, during either high or low-speed in-flight operating conditions.

FIG. 4B shows a close-up view of a portion of the Krueger flap 400 in greater detail. Details shown include a left wing front spar 412, left Krueger flap hinge point 414, a flight spoiler hinge beam 416, left leading edge rib 418, and left outboard flight spoiler 420.

Referring to FIGS. 4A and 4B in combination with FIG. 3, the rounded form 304 of the inboard portion of the leading edge flap 310 smoothly transitions to the form of the Kruger flap at the Krueger flap junction 306 to reduce or minimize any gap in the wing leading edge.

Referring again to FIG. 3, the leading edge 302 of the wing 104 is configured so that the shape of the leading edge flap 310 merges into the form of the Krueger flap 308. In particular, the structure and configuration of the leading edge flap 310 and the Krueger flap 308 are arranged so that when the Krueger flap 308 is deployed, air flow separation over the wing 104 is reduced or minimized. The cross-sectional morphology of the leading edge flap 310 is matched to the Krueger flap 308 to avoid structural discontinuities, protrusions, or gaps that can create a vortex at a position along the leading edge 302, such as at the junction between the Krueger flap 308 and the leading edge flap 310. A vortex formed at the top of the wing 104 corrupts the flow field. The leading edge flap 310 avoids flow field corruption via usage of rounded edges and structures in the Krueger flap 308 and the leading edge flap 310, particularly in the vicinity of the junction.

In various embodiments, the junction between the leading edge flap 310 and the Krueger flap 308 can have some structural discontinuity. For example, the junction can include a step variation, although a gap in flap continuity between the Krueger flap 308 and leading edge flap 310 segments can impact aerodynamic characteristics. In some embodiments, a structural element that smoothes the transition between segments can be used to improve aerodynamic performance. In some embodiments, the structural material can be a flexible material such as rubber, plastic, a synthetic, and the like.

The particular structure of the Krueger flap 308 and the leading edge flap 310 can vary depending on the wing configuration. For example, whether the leading edge 302 is a true supersonic leading edge. In particular, whether the leading edge is contained within the Mach cone of the aircraft. If the leading edge 302 is inside the Mach cone, structural discontinuities, protrusions, and gaps are to be avoided. For a leading edge 302 that is outside the Mach cone, the leading edge flap 310 can include more irregular structures such as a sharp edge transitioning to a Krueger flap structure.

Any suitable element or structure can be used to mate the Krueger flap 308 and the leading edge flap 310 when either stowed or deployed. Generally, the portions of the Krueger flap 308 and the leading edge flap 310 at the junction can be formed so that the edges of each have similar shape, thereby reducing or eliminating structural discontinuity at the junction.

Figure 5A:
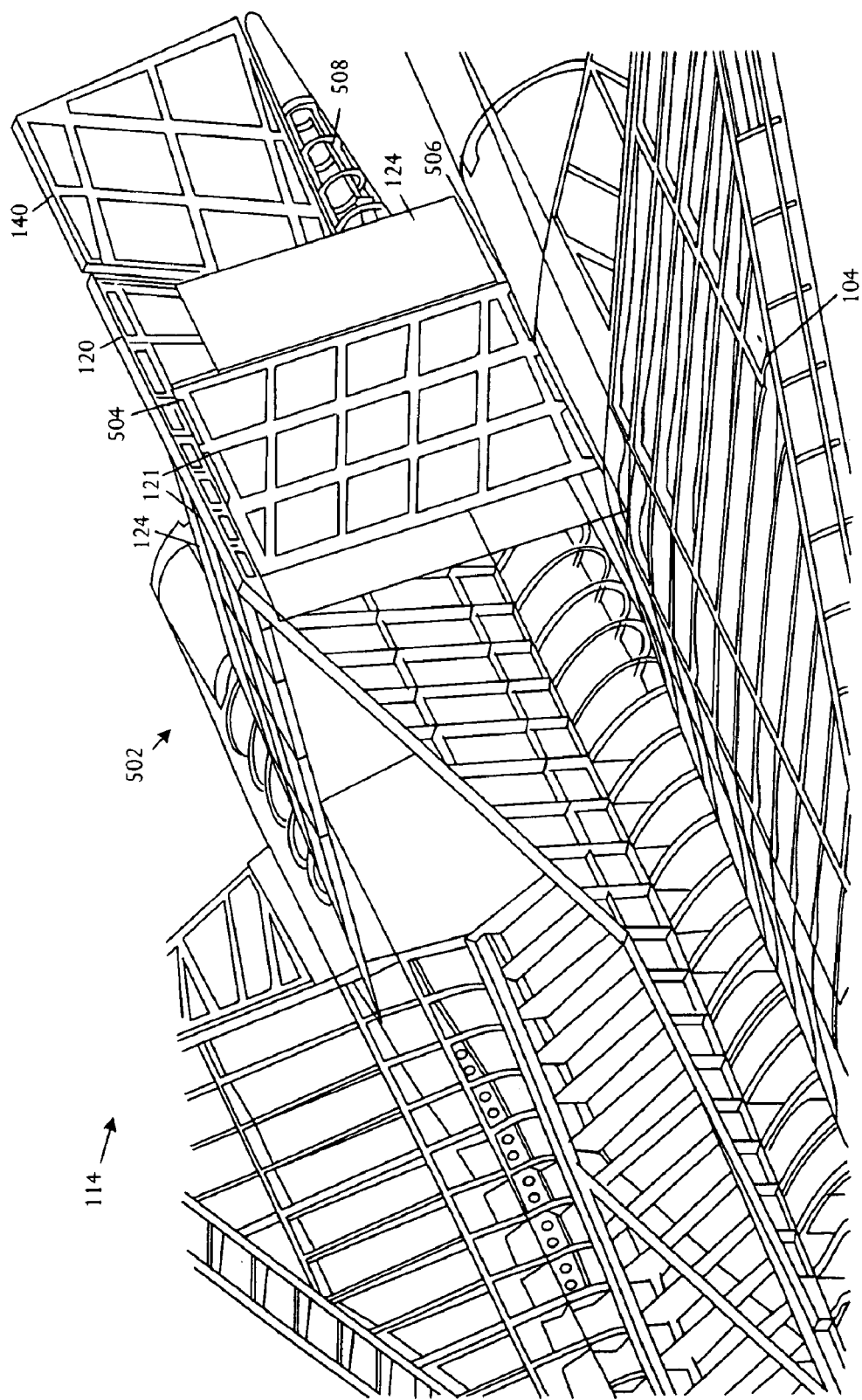
FIGS. 5A, 5B, 5C, 5D, and 5E are multiple schematic pictorial diagrams illustrating various control effectors that can be controlled in combination with center of gravity management.

Referring to FIGS. 5A, 5B, 5C, 5D, and 5E, multiple schematic pictorial diagrams illustrate various control effectors that can be controlled in combination with center of gravity management. FIG. 5A depicts control effectors of the wing 104 and empennage 114 in more detail. The empennage 114 includes a tail structure section 502, a vertical stabilizer to inverted stabilizer joint section 504, and an inverted stabilizer to nacelle joint section 506. The tail structure section 502 includes the vertical stabilizer 120, and a pair of inverted stabilizers 121. Control effectors include the rudder 140 pivotally connected to the trailing edge of the vertical stabilizer 120 and ruddervators 124 pivotally connected to the trailing edge of the inverted stabilizers 121. The vertical stabilizer 120 is attached to the top of the aircraft center body and aft section 508. The top of the vertical stabilizer 120 is attached to the tops of the left and right inverted stabilizers 121.

Figure 5B:
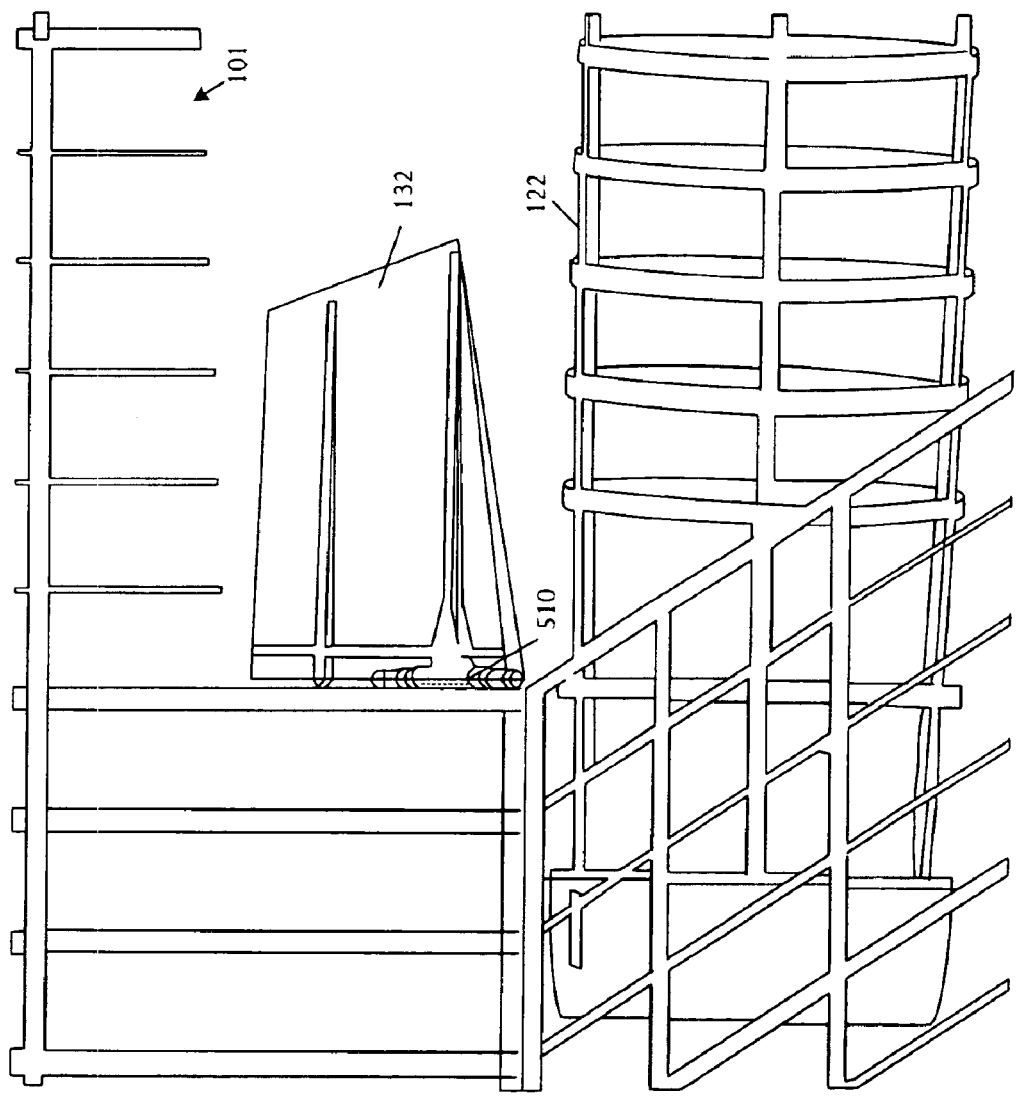
Figure 5C:
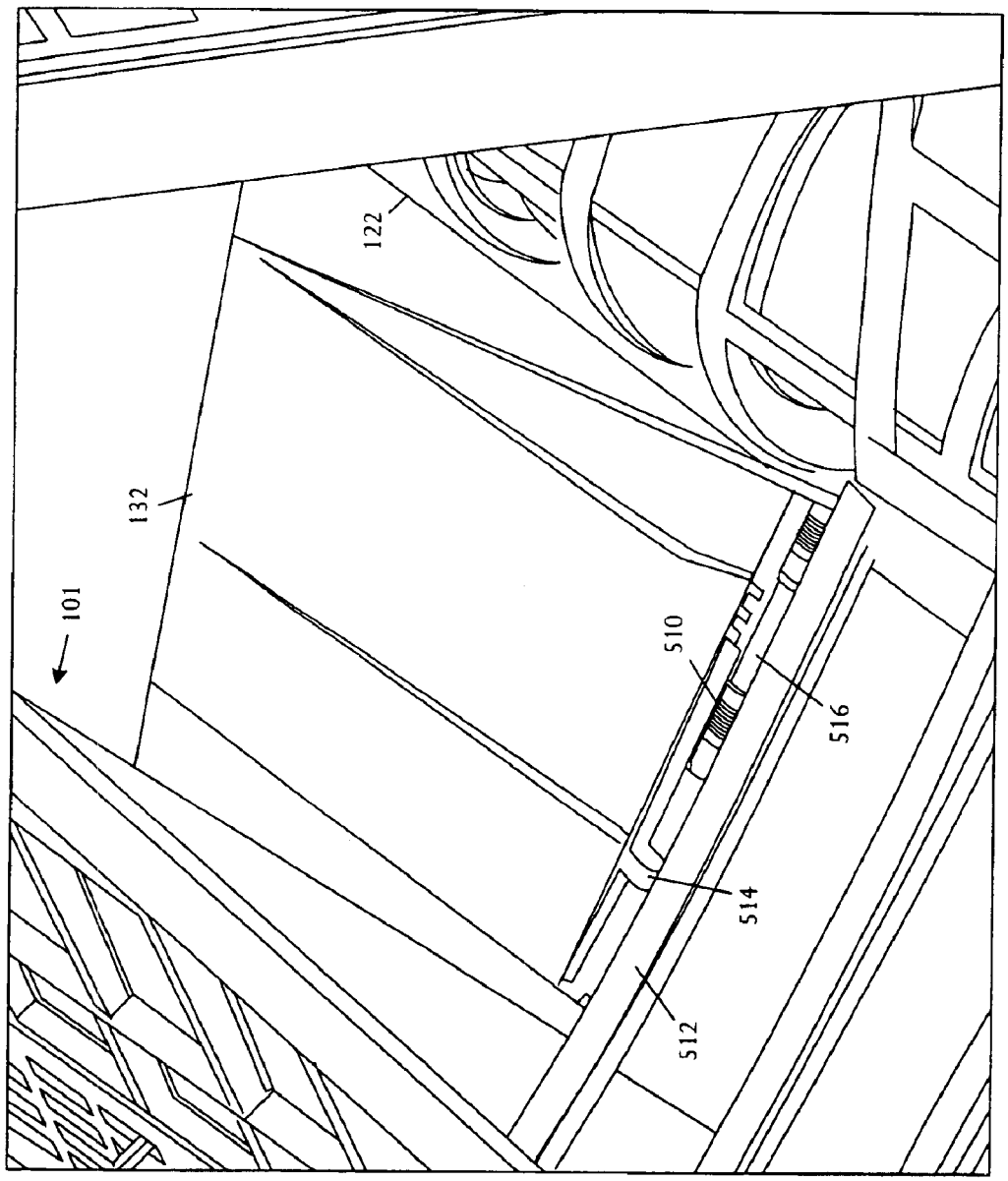

Referring to FIGS. 5B and 5C, two pictorial diagrams illustrate different views of a trailing edge flap 132 that can be used in an embodiment of an aircraft capable of channel relief control. The trailing edge flap 132 is located between the engine nacelle 122 and the fuselage 101. The trailing edge flap surface can rotate in a downward direction in combination with an upward deflection of the ruddervator in a controlled angle to reduce drag. The engine nacelle 122 has sufficient clearance for the flap 132 to deflect to a maximum deflection angle. An actuator 510 drives deflection of the trailing edge flap 132.

FIG. 5C shows the trailing edge flap 132 attached at the inboard wing rear spar 512. The trailing edge flap 132 is pivotally connected to the wing rear spar 512 via a flap hinge 514 and an actuator hinge 516.

Figure 5D:
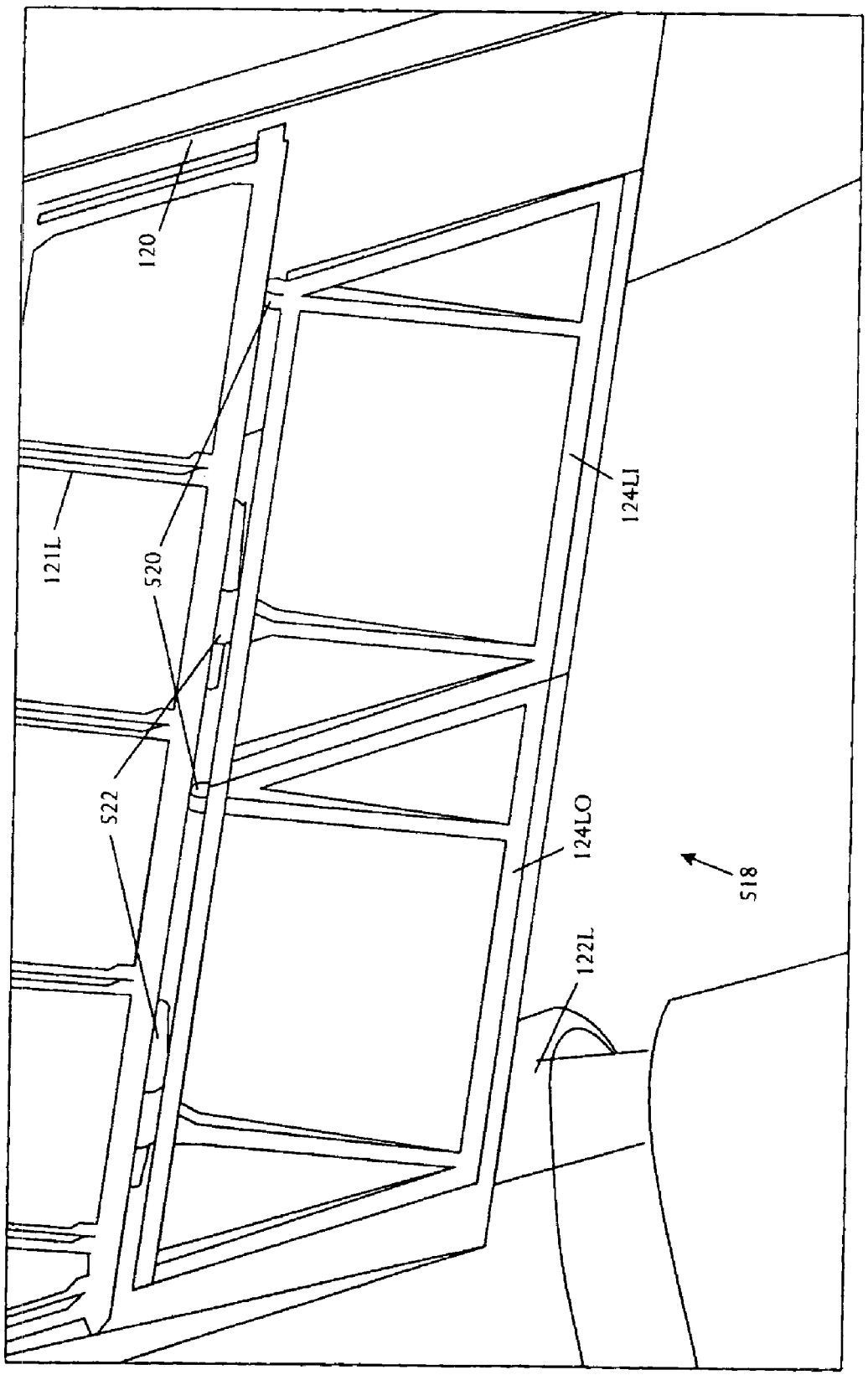
Figure 5E:
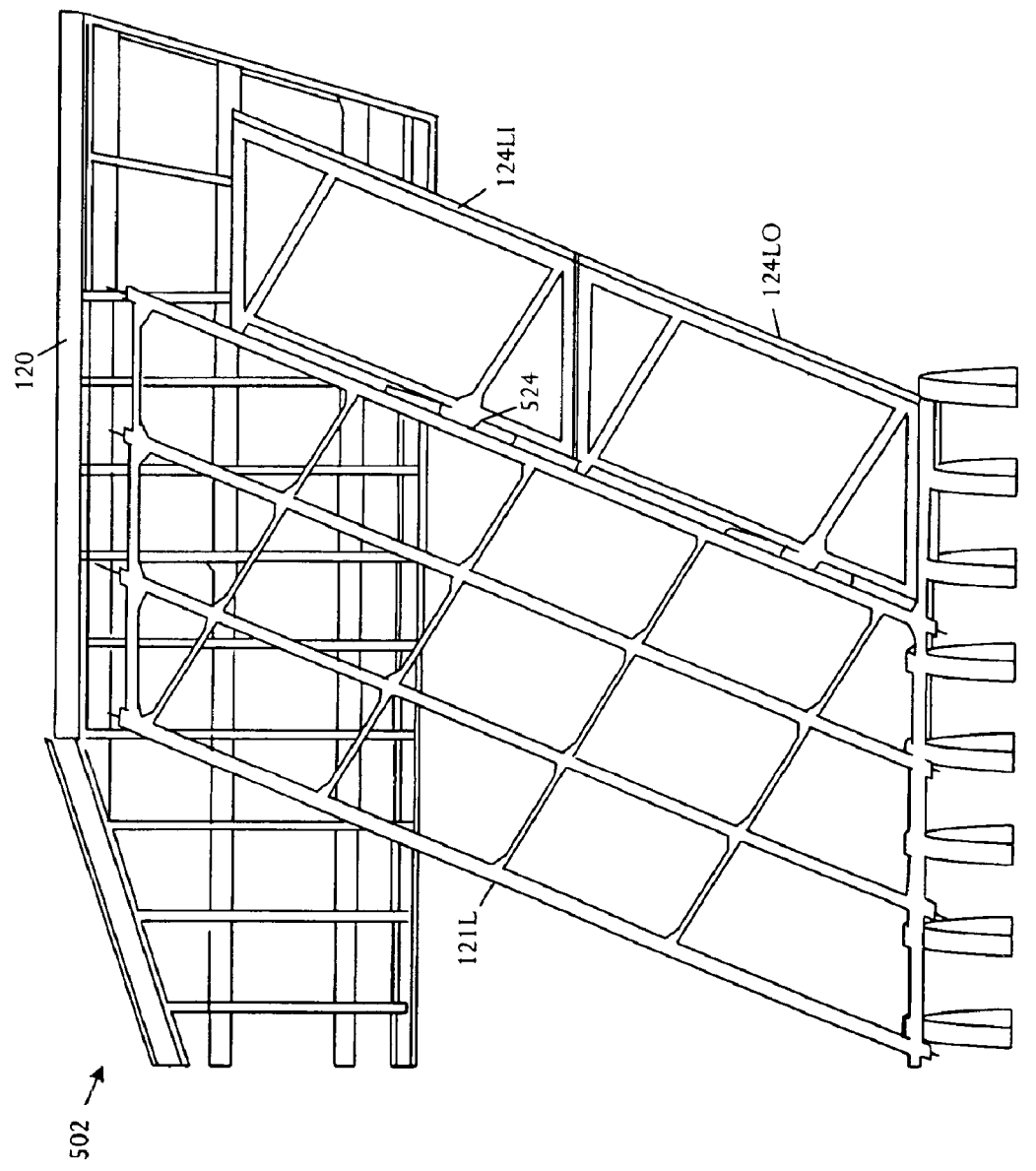

Referring to FIGS. 5D and 5E, two schematic perspective pictorial views show detailed diagrams of portions of the tail structure 502. FIG. 5D shows a ruddervator section 518 including the left inverted stabilizer 121L coupling between the vertical stabilizer 120 and the left wing adjacent to the left nacelle 122L. The illustrative configuration includes two ruddervators on each side, each of which is coupled to the inverted stabilizer. In the depicted view, a left outboard ruddervator 124LO and a left inboard ruddervator 124LI are shown coupled to the left inverted stabilizer 121L using ruddervator hinges 520 and actuator hinges 522 that control movement of the ruddervators. FIG. 5E illustrates baseline actuators 524 for the ruddervators 124. In the illustrative embodiment, the actuators 524 are electromechanical rotary-type actuators that, when integrated into the inverted V-tail, do not protrude into the airstream and thereby avoid increases in aerodynamic drag. The illustrative baseline actuators 524 have integral motor drivers, brakes, and a speed sensor. An aircraft can include multiple ruddervators 124 on each side, a redundancy that is useful to maintain aircraft control in a jammed-surface condition.

Figure 6A:
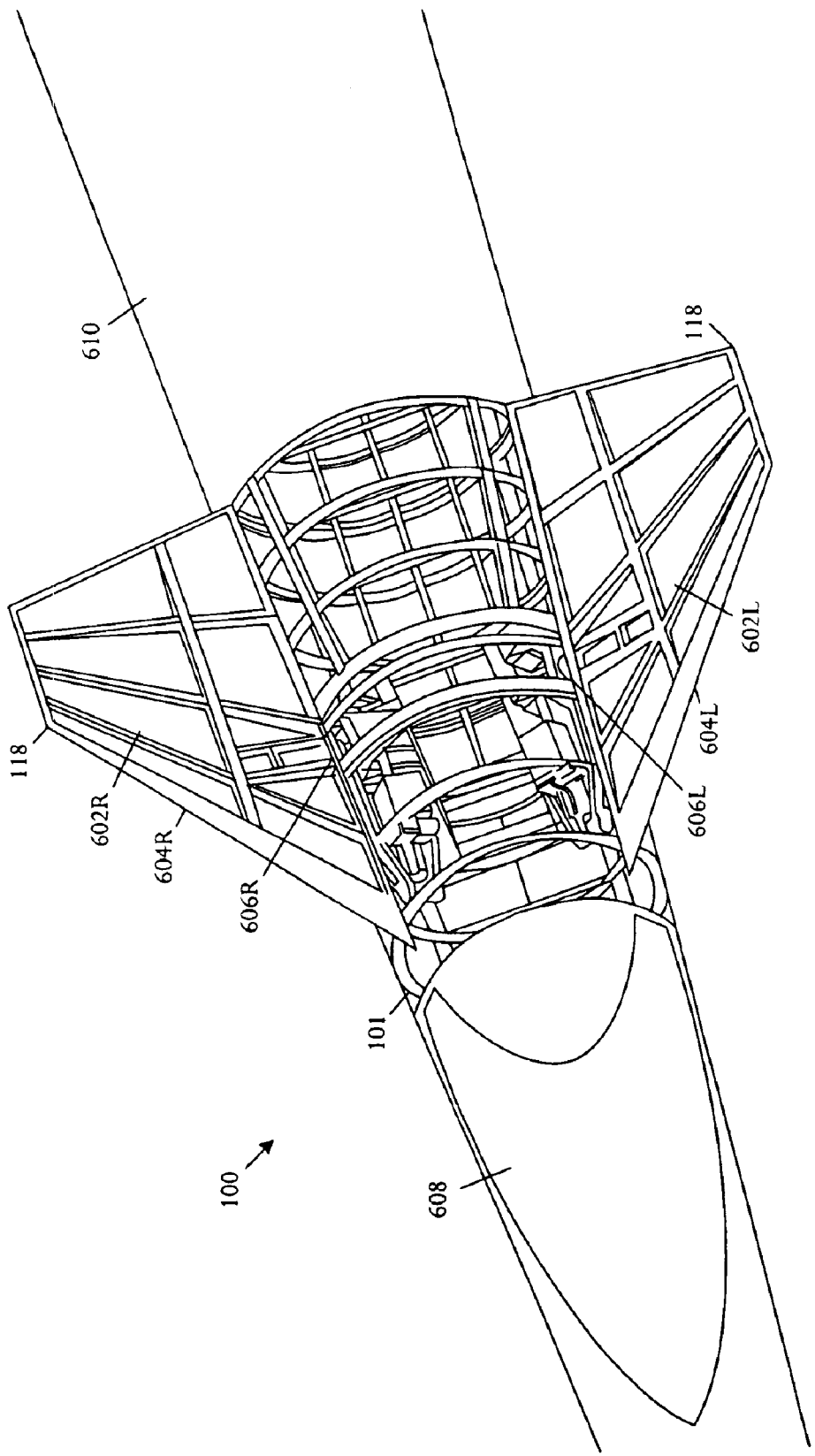
FIGS. 6A and 6B are two schematic pictorial diagrams depicting views of canard control effectors that can operate in conjunction with center of gravity management.
Figure 6B:
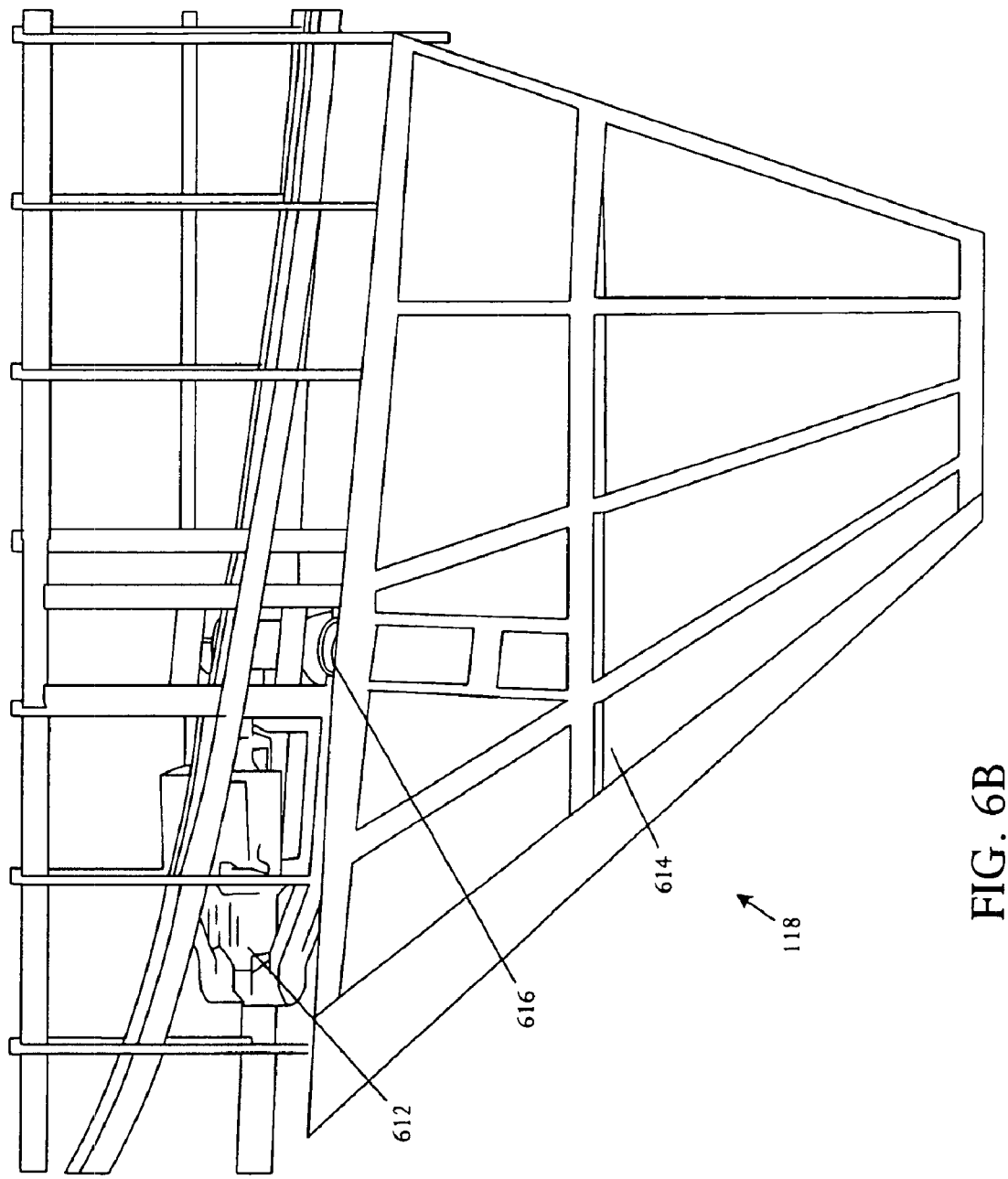

Referring to FIGS. 6A and 6B, two schematic pictorial diagrams depict views of additional control effectors on the aircraft 100, canards 118 coupled to the fuselage 101 forward of the wing 104. FIG. 6A shows a top, cut-away view of the aircraft 100 embodiment in the vicinity of the canard 118. The canard 118 can be particularly effective during takeoff and in high-speed flight. The canard 118 augments the rudder 140 by supplying substantial yaw control power when the left and right canard surfaces are deflected differentially. The diagram shows left and right canard control surfaces 602L and 602R, canard leading edges 604L and 604R, and canard rotation joints 606L and 606R. Also shown is the body or fuselage 101 enclosing a flight crew compartment 608 and a passenger compartment 610. The left and right canard control surfaces 602L and 602R can pivot about the rotation joints 606L and 606R.

Referring to FIG. 6B, a schematic pictorial diagram shows a top, cut-away view of a left canard 118. The canards 118 are each driven by a linear electromechanical actuator (EMA) 612. The canard 118 is used to control pitch and can also be dithered for yaw. In alternative embodiments, a hydraulic actuator can be used to drive motion of the canard. The actuators 612 to multiple canards 118 enable differential control of the canards 118 to induce lift on the fuselage 101 and the wing 104 on opposing sides of the body 101 to cause canard lift and body lift to blend into lift produced by the wing 104.

Figure 7:
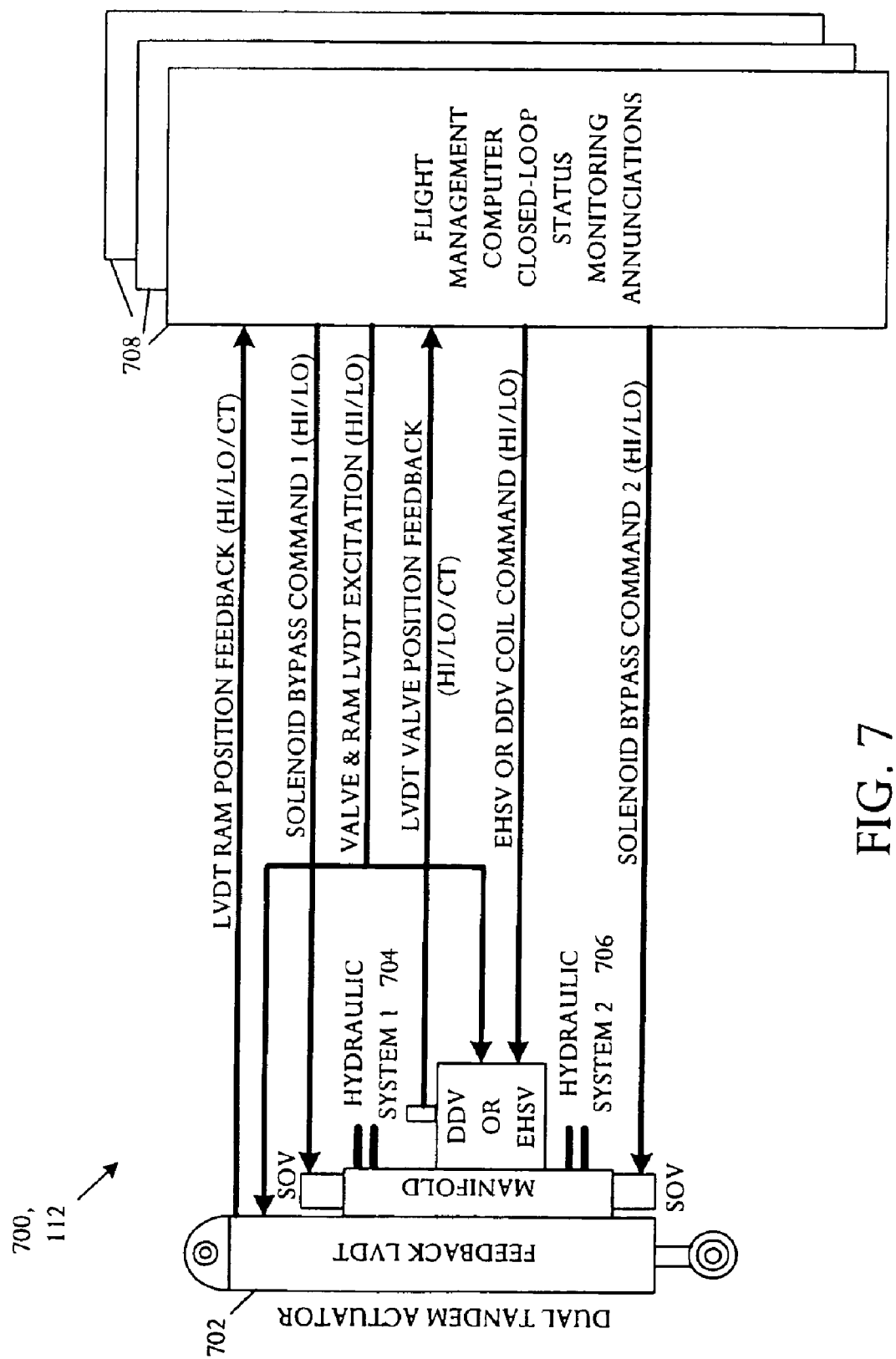
FIG. 7 is a schematic block diagram showing an example a flight control actuation architecture embodiment that can be used as a controller to manage aerodynamic effectors and center of gravity management.

Referring to FIG. 7, a schematic block diagram shows an example a flight control actuation architecture embodiment 700 that can be used as the controller 112 for concurrently managing control effectors and fuel system pumps to manipulate aircraft center-of-gravity. In the illustrative example, primary flight control actuation uses "Fly-by-Wire" dual tandem linear hydraulics with triple electronic redundancy. Dual tandem actuation 702 is powered by two independent hydraulic systems 704 and 706 and sized for full rated performance based on a single system operation. The flight control system is closed-loop and commanded by the Vehicle Management Computers 708. The flight control system 700 performs control law implementations to produce aircraft handling qualities throughout flight. The system 700 can implement outer loop control modes such as Autopilot, Autolanding, and Auto collision avoidance control. The flight control actuation system 700 can also execute system integrity and health management functions. Various types of actuators can be implemented including, for example, Dual Tandem hydraulic actuators, Simplex hydraulic actuators, Rotary vane hydraulic actuators, multiple cylinders hydraulic actuators, integrated rotary electromechanical actuators (IREMA), and the like.

The flight management computers 708 can implement a process that differentially controls the canards 118 to induce lift on the fuselage 101 and the wing 104 on respective opposing sides of the fuselage body 101 to cause lift from the canard and body lift to blend into lift produced by the wing. The computers 708 further control the canards 118 to stretch the aircraft lifting length and tailor the effective area distribution to produce a shaped sonic boom signature. Differential control of the canards 118 can be used to offset effects of the canard dihedral. The flight management computers 708 control the canards 118 in combination with control of center-of-gravity to reduce trim drag.

The control effector configuration, controlled by the Vehicle Management Computers 708, uses redundant control surfaces, enabling continued safe flight and landing in event of a single actuator failure or mechanically-jammed control surface. Redundancy is extended to the ailerons and ruddervators, which are also designed into multiple surfaces for increased fault tolerance and improved overall safety.

The Vehicle Management Computers 708 implement processes for controlling the effectors, including the canards 118, in combination with center-of-gravity control to distribute lift to reduce or minimize sonic signature and to drive the aircraft to relaxed stability. In an illustrative embodiment, two electronic flight control systems are used to give superior handling qualities and optimal performance throughout the flight envelope. The first system is a full-authority Fly-By-Wire system designed for stability and handling qualities and determining the basic dynamic response of the aircraft.

The second flight control system is an active center-of-gravity (CG) management system. As fuel is burned throughout the mission, the CG management system redistributes the remaining fuel to maximize range and reduce or minimize sonic boom signature. The CG management system also enables the canard, wing and inverted V-tail to interact in harmony to lift the vehicle efficiently for maximum range while producing a low sonic boom signature.

Figure 8:
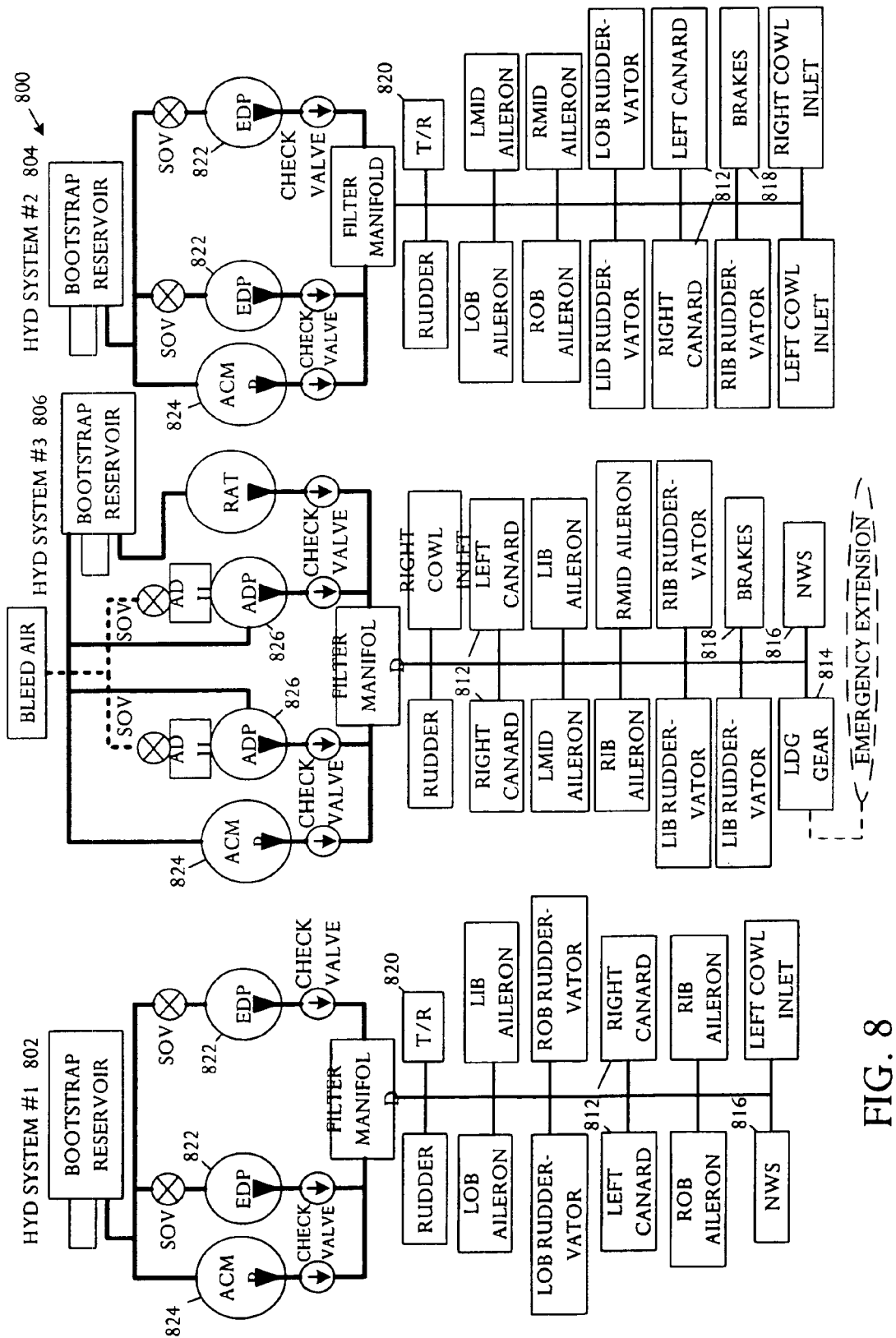
FIG. 8 is a schematic block diagram showing an embodiment of a suitable hydraulic power and distribution system architecture for supplying actuating power to effectors and the center of gravity management system.

Referring to FIG. 8, a schematic block diagram shows an embodiment of a suitable hydraulic power and distribution system architecture 800 for supplying actuating power to effectors and the center of gravity management system. For high reliability, the system 800 is highly redundant with a hydraulic system supplying three independent sources 802, 804, 806 of hydraulic power to operate primary flight controls, landing gear 814, nose wheel steering 816, wheel brakes 818, and thrust reversers 820. The three independent systems 802, 804, 806 give triple redundancy for continued safe flight and landing.

Hydraulic power for the systems is supplied by two engine driven pumps 822 and an AC motor pump 824 on system 1 802 and system 2 804. The engine driven pumps 822 can operate continuously while the AC motor pumps 824 operate on demand basis. Additionally, the AC motor pumps 824 are an extra source of hydraulic power that gives redundancy within each system. The AC motor pumps 824 can be operated on the ground for system checkout without running the engines or using a hydraulic ground carts.

System 3 806 has two air driven pumps 826 and an AC motor pump 824. One air driven pump 826 operates continuously while the other air driven pump 826 and the AC motor pump 824 operate on a demand basis. The AC motor pump 824 in system 3 806 can also be operated on the ground for system checkout without running the engines or using a hydraulic ground cart. System 3 806 also includes a ram air turbine 828 for emergency hydraulic and electrical power in the event of dual engine flameout. The ram air turbine 828 is sized to supply hydraulic and electrical power to essential equipment from the certified altitude to safe landing for level 3 handling quality.

Figure 9:
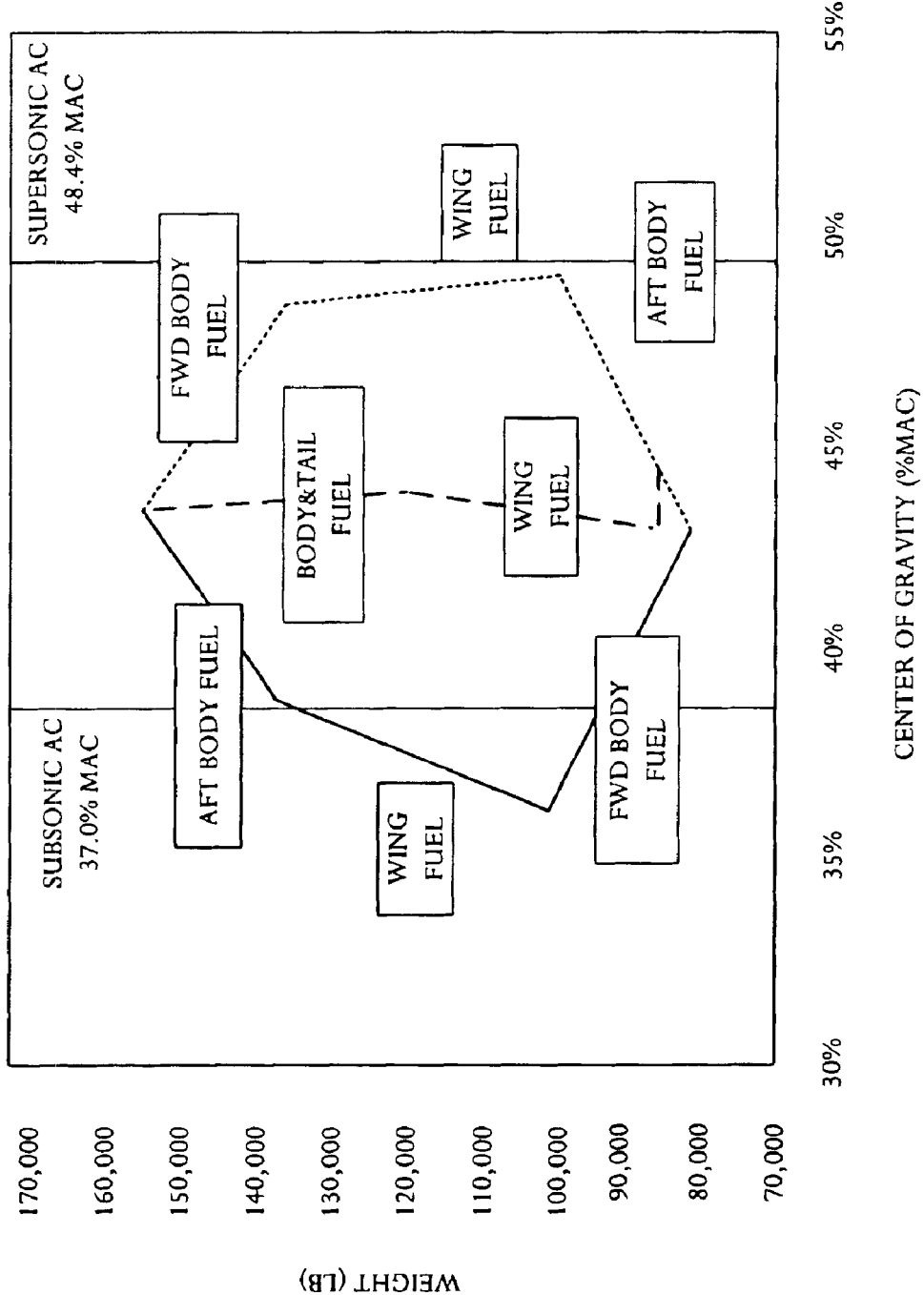
FIG. 9 is a graph that shows a center-of-gravity envelope for an aircraft embodiment.

Referring to FIG. 9, a graph shows a center-of-gravity envelope for an aircraft embodiment. The center of gravity envelope shows the range of aircraft center of gravity from extreme forward to aft that can be attained by the aircraft, along with a nominal, median excursion. The graph shows subsonic and supersonic aerodynamic limits. The graph does not show the expected excursion for typical mission or the rate at which the center of gravity can be moved using fuel management.

Figure 10:
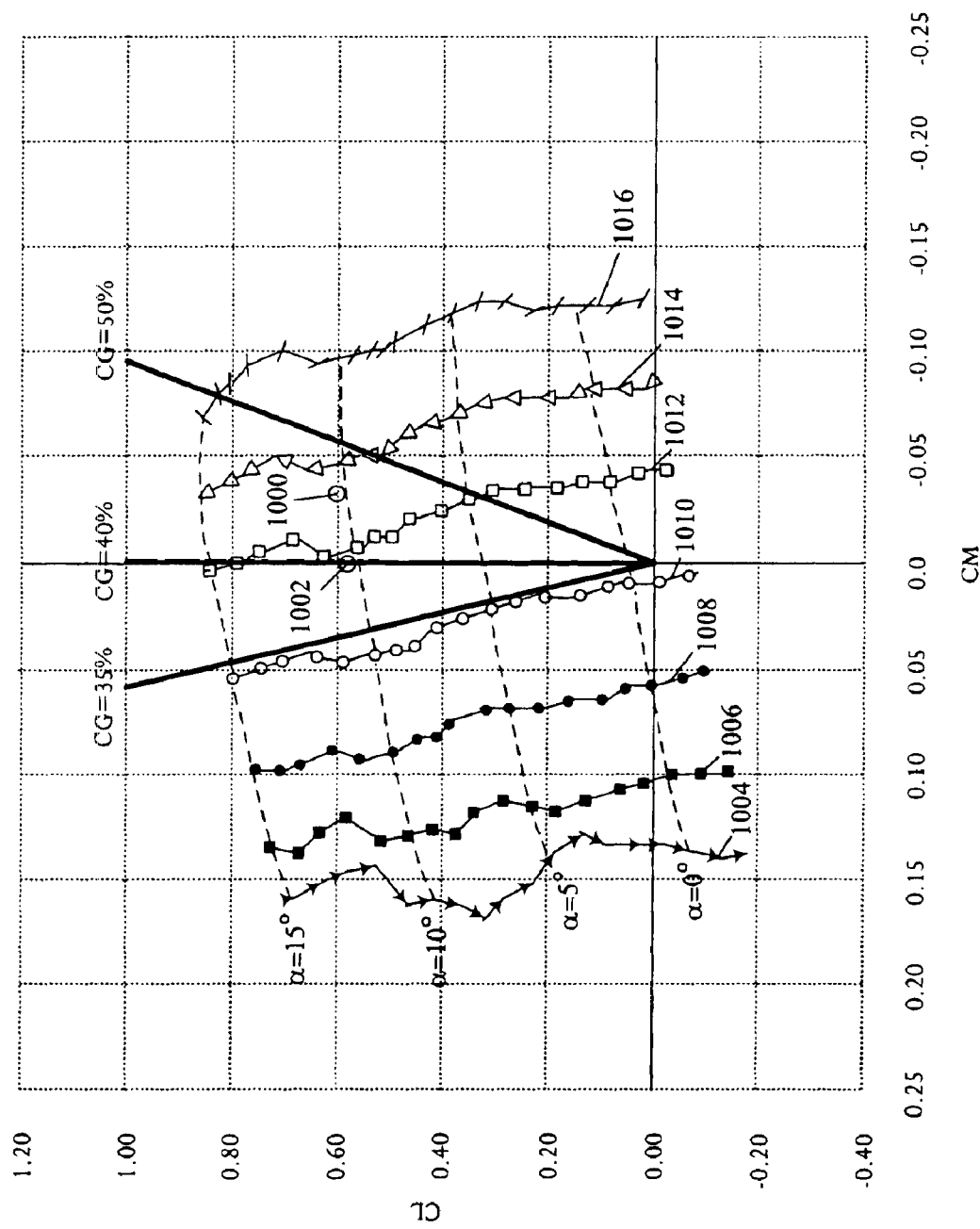
FIG. 10 is a graph showing an example of a control configuration that can be controlled by the Vehicle Management Computers in an embodiment of the supersonic aircraft to attain longitudinal stability and control during takeoff and landing.

Referring to FIG. 10, a graph shows an example of a control configuration that can be controlled by the Vehicle Management Computers 112 in an embodiment of the supersonic aircraft to attain longitudinal stability and control during takeoff and landing. Pitch axis static stability and controllability are assessed by determining the lift coefficient (CL) at a range of aircraft baseline pitch moment coefficients (CM) with all control surfaces at a null position as shown in the graph. The graph shows an example of a nominal center of gravity (CG) range of an aircraft embodiment.

Primary pitch control surfaces that can be controlled in combination with center-of-gravity include the canard and the ruddervators. Total pitch control power is supplied by full deflections of the canard and the ruddervators, shown in the CL vs. CM plot for the low speed takeoff 1000 and landing 1002 condition. In the example, full canard trailing edge down deflection is scheduled as a function of angle-of-attach alpha ($\alpha$) to prevent canard stall. Intersections of center of gravity (CG) lines with the CL-CM curves are trim controls. Trim control is appropriate for the nominal CG range of the aircraft in takeoff 1000 and landing 1002 configurations.

Figure 11:
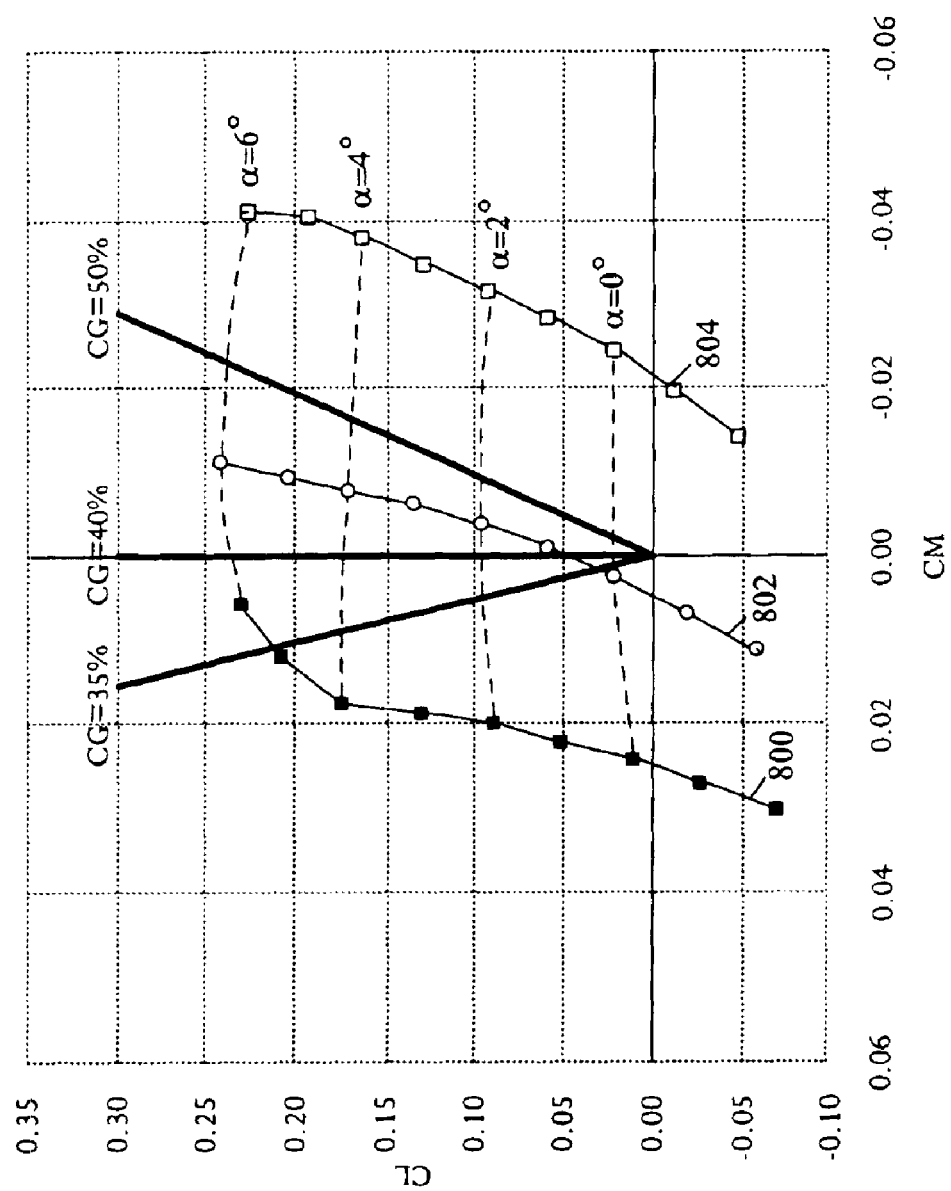
FIG. 11 is a graph illustrating an example of a control configuration that can be controlled by the Vehicle Management Computers in an embodiment of the supersonic aircraft to attain longitudinal stability and control during supersonic cruise.

Referring to FIG. 11, a graph shows an example of a control configuration that can be controlled by the Vehicle Management Computers 112 in an embodiment of the supersonic aircraft to attain longitudinal stability and control during supersonic cruise. The lift coefficient (CL) vs. pitch moment coefficient (CM) plot is depicted for a supersonic cruise condition of Mach 1.8 and includes flexible effects due to aircraft bending. The illustrative aircraft embodiment is stable in the pitch axis in the supersonic cruise condition. Moving the center-of-gravity (CG) aft reduces canard trim. In the center-of-gravity (CG) range from about 40% to approximately 50%, the aircraft has adequate control power for trim for the cruise angle-of-attack $\alpha$ of 2 to 3 degrees.

Figure 12:
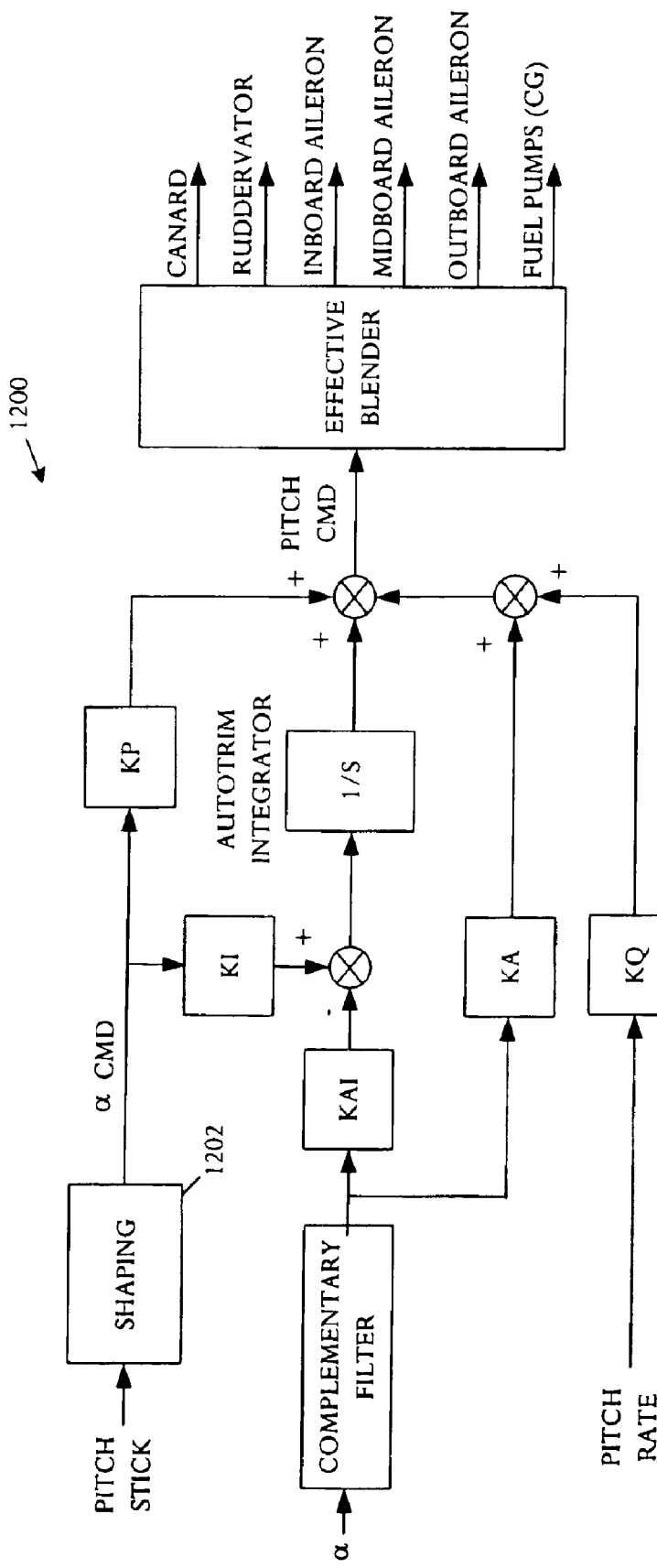
FIG. 12 is a schematic block diagram illustrating an embodiment of a fly-by-wire (FBW) flight control system that attains aircraft controllability via management of control effectors and center of gravity.

Referring to FIG. 12, a schematic block diagram illustrates an embodiment of a fly-by-wire (FBW) flight control system 1200 that attains aircraft controllability via management of control effectors and center of gravity. The aircraft uses control laws to stabilize the aircraft and supply attain appropriate handling qualities to the pilot.

Control surface authority and actuator rate criteria can be predicted by evaluating closed-loop aircraft responses to various levels of atmospheric disturbance and to execute mission tasks for the entire flight envelope. The control laws are defined for three axes: pitch, roll and yaw. For the pitch axis, angle-of-attack (or alpha) command system is used for the takeoff, approach and landing conditions. The control system 1200 can attain precise alpha regulation for pitch control and is generally desired over manual handing by the pilot for satisfactory handling qualities. Calculation of control gains uses an automated algorithm based on the Dynamic Inversion theory. The desired closed-loop short-period eigenvalues are computed based on military standard (Mil-Std-1797) handling qualities criteria and are used for determinations of the feedback and feedforward gains. The gains are scheduled as a function of dynamic pressure. The handling qualities of the closed-loop vehicle are analyzed by using linear theory in the frequency-domain.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, although a particular aircraft geometry and configuration is described, the center-of-gravity control system and techniques for controlling center-of-gravity in combination with control effectors, such as flaps, rudders, elevators, ruddervators, canards, and the like can be utilized in aircraft with different geometries. In particular, although the described aircraft has an inverted V-tail configuration, other tail configurations such as T-tail configurations and others may be used. The illustrative fuel tank and pump configuration includes a specific number of tanks and pumps in a particular geometric configuration. Other suitable embodiments may have more or fewer tanks, more or fewer pumps, and different types of tanks and pumps. In addition, the tanks and pumps may be arranged in different configurations and placed in different locations. The proportion of tank volume arranged in the wings and fuselage may be different. In various embodiments, the number of computers and centralization or decentralization of computing resources may be varied. For example, control functionality may be dispersed throughout the aircraft or confined to the aircraft central control system.

What is claimed is:

1. A supersonic aircraft comprising:

an aerodynamic body;

a plurality of fuel tanks contained within the aerodynamic body;

a fuel transfer system communicatively coupled to the plurality of fuel tanks and capable of transferring fuel among the plurality of fuel tanks;

at least one sensor capable of indicating a flight parameter; and a controller coupled to the at least one sensor and the fuel transfer system, the controller configured to transfer fuel among the plurality of fuel tanks to position the aircraft center-of-gravity in a relatively aft position when the flight parameter is indicative of supersonic flight whereby sonic boom is reduced.

2. The aircraft according to claim 1 further comprising:

at least one canard coupled to the aerodynamic body and having at least one control effector;

at least one wing coupled to the aerodynamic body and having at least one control effector; and an inverted V-tail coupled to the aerodynamic body and having at least one control effector;

wherein the controller is configured to redistribute fuel among the plurality of fuel tanks and operate the control effectors on the canard, the wing, and the inverted V-tail to adjust the aircraft center of gravity to modify the aircraft lift distribution, reduce trim drag, and attenuate aircraft sonic boom.

3. The aircraft according to claim 1 further comprising:

at least one canard coupled to the aerodynamic body, wherein the controller is adapted to transfer fuel among the plurality of fuel tanks to adjust the aircraft center of gravity aftward in a supersonic cruise condition to reduce canard trim requirements and increase aircraft controllability.

4. The aircraft according to claim 1 further comprising:

at least one canard coupled to the aerodynamic body and having at least one primary pitch control surface, wherein the controller is adapted to set the at least one primary pitch control surface and transfer fuel among the plurality of fuel tanks to adjust the aircraft center of gravity in coordination to adjust angle-of-attack alpha ($\alpha$) to prevent canard stall.

5. The aircraft according to claim 1 further comprising:

a plurality of control effectors coupled to the aerodynamic body, wherein the controller is adapted to operate the aircraft in a maximum range, maximum Mach mode whereby the control effectors are developed for relatively reduced trim drag and center of gravity is positioned relatively forward, and adapted to operate the aircraft in a relatively reduced-range, relatively lower Mach mode whereby control effectors are deployed for relatively increased trim drag and center of gravity is positioned relatively aft.

6. The aircraft according to claim 1 further comprising;

a plurality of control effectors coupled to the aerodynamic body, wherein the controller is adapted to control aircraft center-of-gravity concurrently with the plurality of control effectors to move the center-of-gravity more aft during supersonic operation and more forward during takeoff, approach, and landing.

7. The aircraft according to claim 1 wherein:

the controller transfers fuel among the plurality of fuel tanks to adjust the aircraft center of gravity so that fuel in forwardmost tanks is consumed first, configuring aircraft trim on attaining cruise condition at a maximum aft center-of-gravity for a reduced sonic boom condition.

8. An automated fuel transfer system for usage in a supersonic aircraft including a fuselage and wing, the automated fuel transfer system comprising:

a plurality of fuel tanks distributed within the wing and/or the fuselage;

a plurality of pumps coupled to the plurality of fuel tanks and capable of transferring fuel among the plurality of fuel tanks;

at least one sensor capable of indicating a flight parameter; and a controller coupled to the at least one sensor and the plurality of pumps, the controller configured to transfer fuel among the plurality of fuel tanks to position the aircraft center-of-gravity in a relatively aft position when the flight parameter is indicative of supersonic flight whereby lift distribution is modified and sonic boom is reduced.

9. The system according to claim 8 further comprising:

a plurality of control effectors coupled to the fuselage and/or wing, wherein the controller is capable of transferring fuel among the plurality of fuel tanks to adjust the aircraft center of gravity to adjust the aircraft center of gravity and reduce trim drag and increase aircraft range wherein the controller is configured to redistribute fuel among the plurality of fuel tanks and operate the control effectors to adjust the aircraft center of gravity aftward, reducing trim drag and increase aircraft range.

10. The system according to claim 8 further comprising;

at least one canard coupled to the fuselage and/or wing, wherein the controller is adapted to transfer fuel among the plurality of fuel tanks to adjust the aircraft center of gravity aftward in a supersonic cruise condition to reduce canard trim criteria and increase aircraft controllability.

11. The system according to claim 8 further comprising:

at least one canard coupled to the fuselage and/or wing and having at least one primary pitch control surface, wherein the controller is adapted to set the at least one primary pitch control surface and transfer fuel among the plurality of fuel tanks to adjust the aircraft center of gravity in coordination to adjust angle-of-attack alpha ($\alpha$) to prevent canard stall.

12. The system according to claim 8 further comprising:

a plurality of control effectors coupled to the fuselage and/or wing, wherein the controller is adapted to operate the aircraft in a maximum range, maximum Mach mode whereby the control effectors are deployed for relatively reduced trim drag and center of gravity is positioned relatively forward, and adapted to operate the aircraft in a relatively reduced-range, relatively lower Mach mode whereby control effectors are deployed for relative increased trim drag and center of gravity is positioned relatively aft.

13. The system according to claim 8 wherein:
the controller transfers fuel among the plurality of fuel tanks to adjust the aircraft center of gravity in compliance with control laws to stabilize the aircraft by evaluating closed-loop aircraft responses to atmospheric disturbance.

14. The system according to claim 8 wherein:
the controller transfers fuel among the plurality of fuel tanks to adjust the aircraft center of gravity so that fuel in the forwardmost tanks is consumed first, and configuring the aircraft trim on attaining cruise condition at maximum aft center-of gravity, reducing sonic boom.

15. An aircraft control system for usage in a supersonic aircraft including a fuselage and wing, the control system comprising:
a plurality of control effectors coupled to the wing;
a plurality of fuel tanks distributed within the wing and/or the fuselage,
a plurality of pumps coupled to the plurality of fuel tanks and capable of transferring fuel among the plurality of fuel tanks;
a plurality of actuators coupled to the control effectors;
at least one sensor capable of indicating a flight parameter; and
at least one vehicle management computer coupled to the at least one sensor, the plurality of pumps, and the plurality of actuators, the at least one vehicle management computer adapted to respond to the flight parameter to operate the control effectors and transfer fuel among the plurality of fuel tanks to adjust aircraft trim and center of gravity position and operate the aircraft in at least two flight modes, the flight modes including a reduced sonic boom mode wherein center of gravity is position relatively aftward.

16. The system according to claim 15 wherein:
the at least one vehicle management computer operates the aircraft in a maximum range, maximum Mach over water mode with control effectors deployed for relatively reduced trim drag and center of gravity positioned relatively forward, and operates the aircraft in a slightly reduced range, relatively lower Mach over land mode with control effectors deployed for a slight increase in trim drag and center of gravity positioned relatively aft to reduce sonic boom.

17. The system according to claim 15 wherein:
the at least one vehicle management computer controls the fuel tanks to burned in sequence for aircraft center of gravity so that fuel in the forwardmost tanks is consumed first, and configuring the aircraft trim on attaining cruise condition at a maximum aft center-of gravity for a reduced sonic boom condition.

18. The system according to claim 15 further comprising:
a plurality of fuel boost pumps positioned outside of the fuel tanks for the ease of accessibility and maintenance without defueling the aircraft, the fuel boost pumps including dual boost pumps in forward and aft fuselage feed tanks, fuel from the forward fuselage tank being supplied to engines first to begin shifting the aircraft center of gravity aft in preparation for supersonic flight, upon fuel in the forward fuselage tank being consumed to a predetermined level aft fuselage dual boost pumps continuing supplying fuel to the engines.

19. The system according to claim 15 further comprising:
a fuel scavenge system that removes remaining fuel in fuel tanks using a cross feed valve connecting left and right fuel feed manifold in the event of total fuel failure on either side; and
an intertank shut off valve between forward and aft fuselage tanks for transferring fuel from one side to the other during the flight due in event of fuel imbalance.

20. The system according to claim 15 wherein:
the controller transfers fuel among the plurality of fuel tanks to adjust the aircraft center of gravity to:
adjust the aircraft center of gravity to reduce trim drag and increase aircraft range;
adjust the aircraft center of gravity to reduce trim criteria to increase aircraft controllability;
adjust the aircraft center of to maintain the aircraft stability during flight; and
adjust the aircraft center of gravity and adjust the aircraft longitudinal lift distribution throughout the flight envelope to maintain a low-boom, low-drag trim condition.

* * * * *